(12) United States Patent
Kawabe

(10) Patent No.: US 7,706,100 B2
(45) Date of Patent: Apr. 27, 2010

(54) STORAGE APPARATUS, STORAGE CONTROL CIRCUIT, AND HEAD-POSITION-DISPLACEMENT MEASURING METHOD

(75) Inventor: Takayuki Kawabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/998,066

(22) Filed: Nov. 28, 2007

(65) Prior Publication Data

US 2008/0198501 A1 Aug. 21, 2008

(30) Foreign Application Priority Data

Feb. 16, 2007 (JP) ............... 2007-035957

(51) Int. Cl.
*G11B 5/596* (2006.01)

(52) U.S. Cl. ..................... 360/77.04; 360/75

(58) Field of Classification Search ........... None
See application file for complete search history.

(56) References Cited

U.S. PATENT DOCUMENTS

| 5,523,899 | A | * | 6/1996 | Parken et al. ............ 360/77.04 |
| 5,991,115 | A | * | 11/1999 | Chainer et al. ............... 360/75 |
| 6,091,564 | A | * | 7/2000 | Codilian et al. ............... 360/75 |
| 7,019,933 | B2 | * | 3/2006 | Iseri et al. ..................... 360/75 |
| 7,405,897 | B2 | * | 7/2008 | Dougherty et al. ........... 360/75 |
| 7,440,222 | B2 | * | 10/2008 | Nakamura et al. ....... 360/77.04 |
| 7,486,467 | B2 | * | 2/2009 | Sai et al. ....................... 360/75 |

FOREIGN PATENT DOCUMENTS

| JP | 09-045025 | 2/1997 |
| JP | 2005-166115 | 6/2005 |
| JP | 2005-166116 | 6/2005 |

* cited by examiner

*Primary Examiner*—Hoa T Nguyen
*Assistant Examiner*—James L Habermehl
(74) *Attorney, Agent, or Firm*—Greer, Burns & Crain, Ltd.

(57) ABSTRACT

A measurement recording unit causes the head to move across a predetermined amount, at least more than one track during one lap of track, with a predetermined radial position and a track position of the magnetic disk being taken as recording start points, thereby writing measurement data while drawing a spiral path. A measurement reading unit causes the measurement data recorded in a spiral manner to be read while gradually shifting a read-beginning point within a predetermined scanning range from an inner perimeter side including the recording start points to an outer perimeter side. A position-displacement detecting unit finds a distribution of amplitudes of a read-back signal within a read scanning range and detects, in a distribution of evaluation values, an amount of position displacement of a read head and a write head on the storage medium in a radial direction for storage.

20 Claims, 17 Drawing Sheets

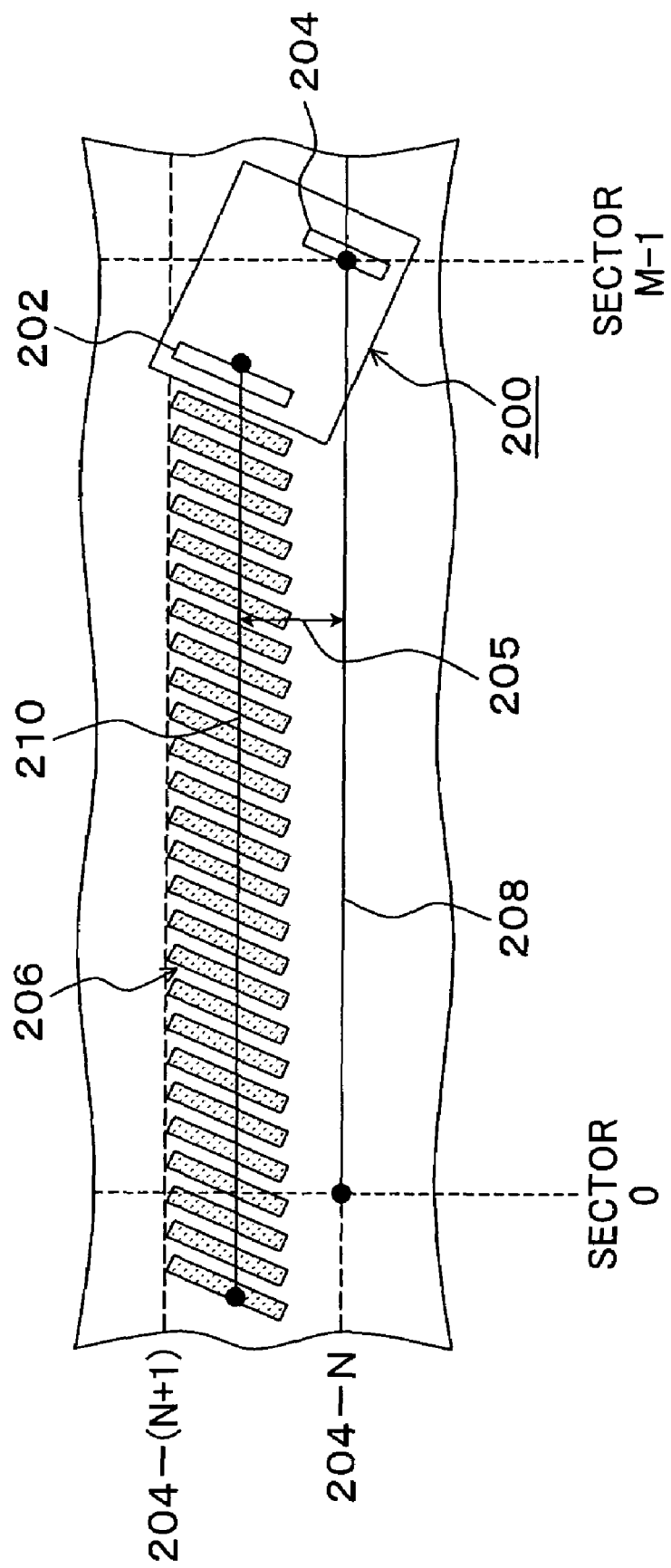

FIG. 6B
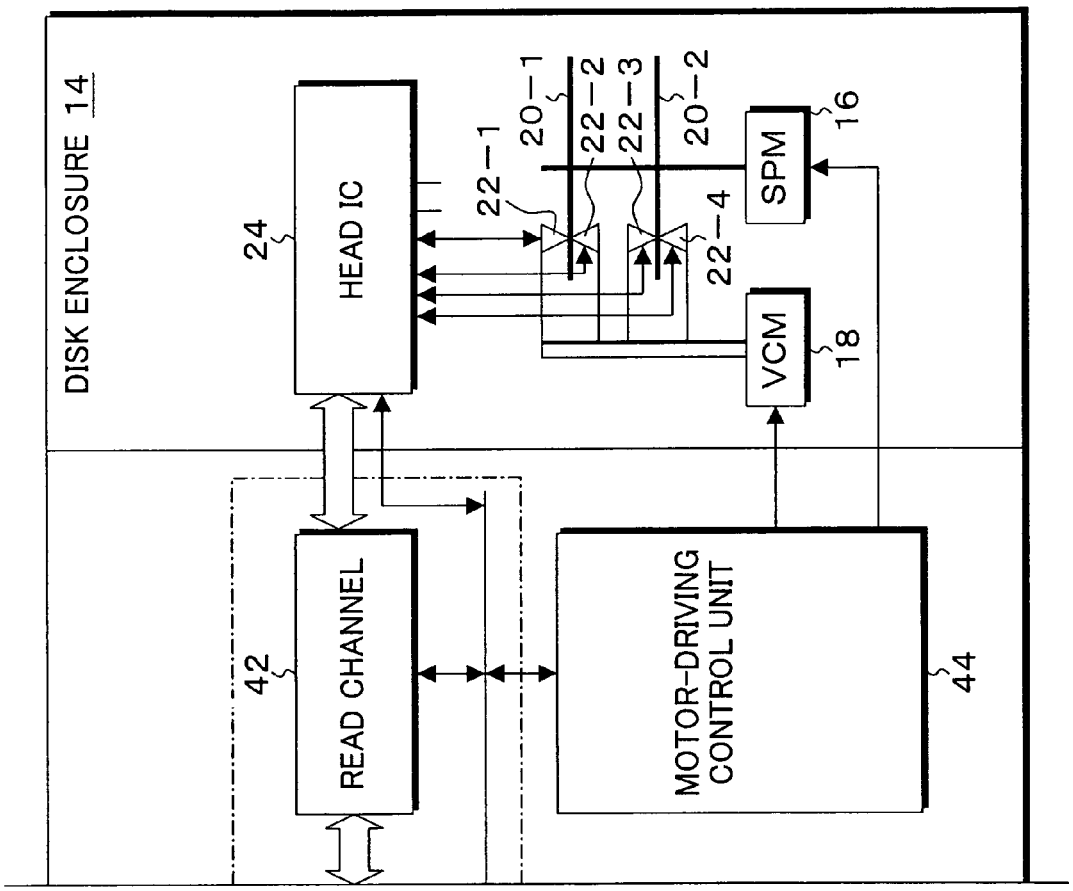

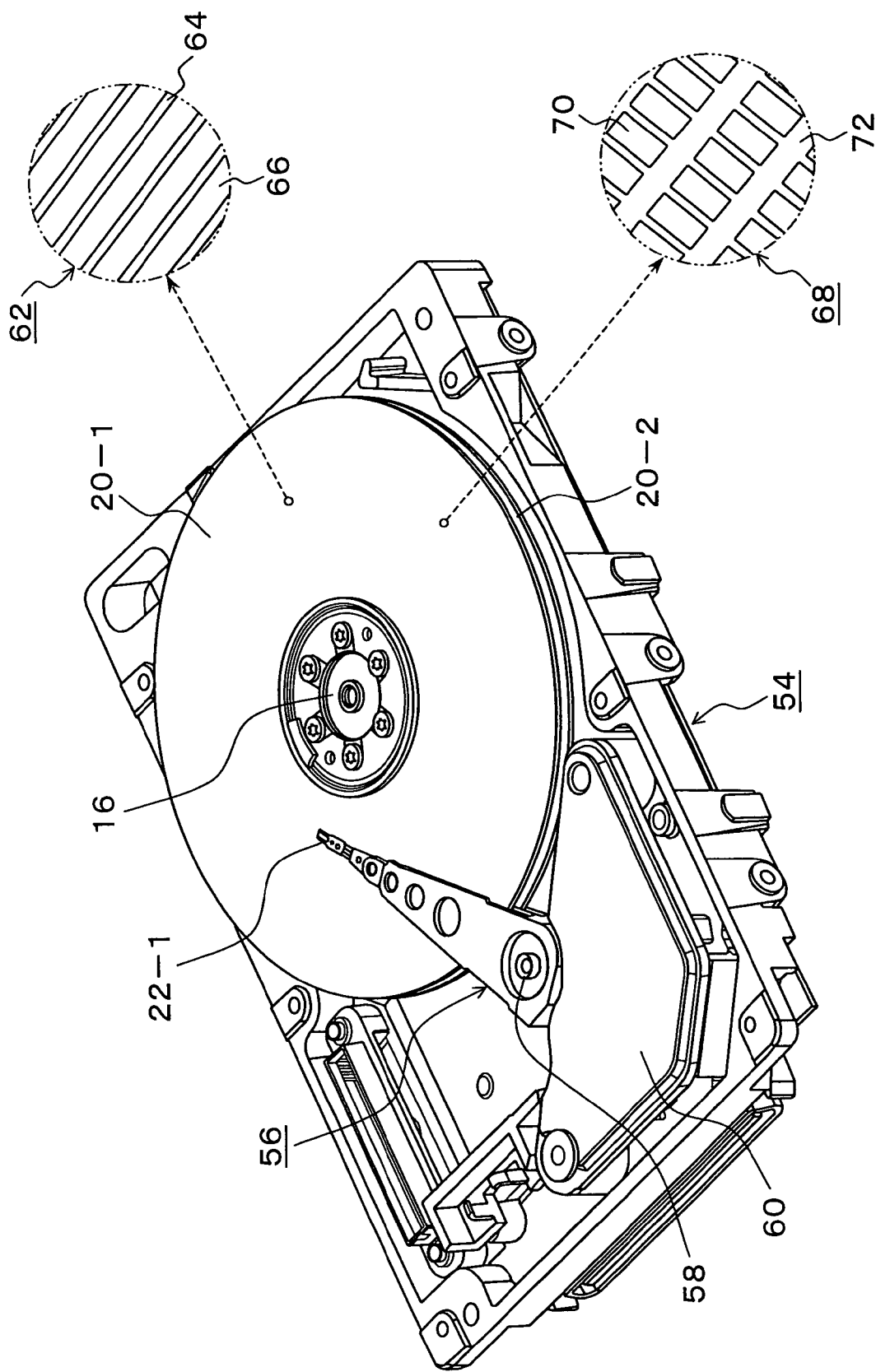

FIG. 9

| HEAD NUMBER | CYLINDER ADDRESS | AMOUNT OF POSITION DISPLACEMENT |
|---|---|---|
| HH01 | CC1 | OFF1 |
|  | CC2 | OFF2 |
|  | CC3 | OFF3 |
|  | ⋮ | ⋮ |
|  | CCn | OFFn |
| HH02 | CC1 | OFFn+1 |
|  | CC2 | OFFn+2 |
|  | CC3 | OFFn+3 |
|  | ⋮ | ⋮ |
|  | CCn | OFF2n |
| HH03 | CC1 | OFF2n+1 |
|  | CC2 | OFF2n+2 |
|  | CC3 | OFF2n+3 |
|  | ⋮ | ⋮ |
|  | CCn | OFF3n |
| HH04 | CC1 | OFF3n+1 |
|  | CC2 | OFF3n+2 |
|  | CC3 | OFF3n+3 |
|  | ⋮ | ⋮ |
|  | CCn | OFF4n |

52

STORAGE APPARATUS, STORAGE CONTROL CIRCUIT, AND HEAD-POSITION-DISPLACEMENT MEASURING METHOD

This application is a priority based on prior application No. JP 2007-035957, filed Feb. 16, 2007, in Japan.

BACKGROUND OF THE INVENTION

1. Field of the Invention

The present invention relates to a storage apparatus, storage control circuit, and head-position-displacement measuring method for detecting a head position displacement of a write head and a read head provided to a head and correcting an amount of position displacement of the read head at the time of reading a storage medium. In particular, the present invention relates to a storage apparatus, storage control circuit, and head-position-displacement measuring method for measuring a head position displacement targeted for a storage medium provided to a non-magnetic area between tracks.

2. Description of the Related Arts

In magnetic disk apparatus in recent years, a combined-type head structure has been adopted in which a highly-sensitive read head using, for example, tunnel magnetoresistance effect (TMR), is independent from a write head. In the head having such a configuration, a position displacement of the write head and the read head occurring in a head manufacturing process cannot be completely eliminated, and therefore paths through which the write head and the read head pass at the time of recording on a certain track will be different. Therefore, it is required that such a displacement amount be measured in advance in, for example, a manufacturing inspection process, for storage, and then a correction be made by that displacement amount from a radial position at the time of recording data on a target track to read-back the data on the target track. In recent years, a space between adjacent tracks has been on the order of 200 nm. If a position displacement of the write head and the read head is several μm, a position displacement correction corresponding to several tracks has to be required. This tendency becomes a more important problem as the space between tracks is narrowed more with the advance of high density. Also in recent years, in magnetic disk apparatus, the tide of downsizing is significant and, accordingly, a disk medium capable of high-density recording has been demanded. However, in improving the recording density of magnetic disk s, there is a problem of how to prevent interference from an adjacent recording bit. Under the recognition of such a problem, a technology called discrete-track recording has been conventionally suggested, in which, against interference of a magnetic disk medium in a radial direction, the magnetic disk medium is physically sectioned for each track to reduce interference from an adjacent track. Furthermore, under the recognition of the same problem in which interference from an adjacent recording bit is prevented to address an increase in recording density, a technology called patterned media has also been conventionally suggested in which a magnetic disk medium is physically sectioned also in a perimeter direction, that is, patterning in units of recording bits is performed, thereby reducing interference from an adjacent bit. Therefore, it has been demanded that, also for storage media using technologies, such as discrete tracks and patterned media, a position displacement correction of the write head and the read head be accurately performed to achieve high-density recording.

FIG. 1 linearly depicts one track length of a recording medium in a process of measuring a head position displacement, in which M number of servo sectors correspond to one cycle of track. To correct a position displacement of a write head 202 and a read head 204 provided to a combined-type head 200, first with the write head 202 being positioned at a track 204-N at a certain radial position by using a head position signal obtained through servo-sector reading by the read head 204, a measurement signal of one cycle of track is recorded on a measurement pattern 206 as shown. At this time, since a position displacement is present between the read head 204 and the write head 202, the read head 204 takes a path 208 that matches with a track 204-N, but the write head 202 takes a path 210 at a position shifted from the track 204-N, the position where the measurement pattern 206 is written. The amount of position displacement is detected by, after writing the measurement pattern 206, reading a read position in a radial direction at which the read head 204 is positioned while gradually shifting the read position of the read head 204 from the position where the measurement pattern 206 is written, and finding, for example, a profile (distribution) of amplitudes of a read-back signal, thereby obtaining FIG. 2A.

In FIG. 2A, a profile (signal distribution) can be obtained in which the amplitude of the read-back signal is low at a write position 212 of the measurement pattern, the amplitude of the read-back signal is increased when the measurement pattern is read while gradually shifting the read position and, after reaching its peak point 214, the amplitude is again decreased. An offset value 218 to the peak point 214 at which the amplitude of the read-back signal is maximum in the profile 216 of the read-back signal amplitude 216 is detected as an amount of position displacement of the read head and the write head. Here, the value of the amplitude of FIG. 2A represents an average value of amplitudes of the read-back signal read over one track. Amplitudes of the read-back signal of the peak 214 and a ½ peak point 220 are average values of the read-back signal amplitudes 222 and 224 read over one track as depicted in FIG. 2B. For example, a method has been suggested in which, by using this position displacement detection method, an area for measuring a track displacement is provided on the storage medium to measure changes with time in position displacement of the write head and the read head (JP 09-045025). However, in such a position displacement detection method, it is impossible to support discrete tracks and patterned media that may possibly be positioned at a place where no magnetic substance is placed. For example, as depicted in FIG. 3, in the case of discrete tracks, a non-magnetic area 228 is present on both sides of a track formed of a magnetic area 226. If a path 210 of the write head 202 when the read head 204 is positioned on the track 204-N is just on the magnetic area 226, a profile when the read head 204 is offset to position displacement detection to search the measurement pattern 206 is similar to that of FIG. 2A. However, as depicted in FIG. 4, when the path 210 of the write head 202 is on the non-magnetic area 228, the measurement pattern 206 is not accurately recorded, and a profile of amplitudes of the read-back signal when the measurement pattern 206 is read while gradually shifting the read position of the read head 204 is such as a profile 216-1 of FIG. 5A, thereby making it difficult to specify an offset value of a peak point 214-1 where the amplitude of the read-back signal is at maximum. Here, FIG. 5B represents amplitudes of the read-back signal at read positions of the peak point 214-1 and the ½ peak point 220-1 as read-back signal amplitudes 222-1 and 224-1 read over one track. To solve these problems, a storage medium and a magnetic storage apparatus have also been suggested in which an area in which magnetic substances are successively formed in a radial direction of the medium is provided between a servo sector and a data sector of a storage medium (JP 2005-166115 and JP 2005-166116).

However, when the area in which magnetic substances are successively formed in the radial direction of the medium is provided between the servo sector and the data sector as in JP 2005-166115 is used for a special area for position displacement correction measurement of the write head and the read head, user data cannot be written in that area, thereby decreasing the recording capacity by that amount. Moreover, in order to accurately measure the amount of position displacement correction, a measurement area that is long to some extent, for example, one cycle of track, is required so as to average read-back signals of the measurement pattern to remove noise, thereby causing user data format efficiency to deteriorate.

SUMMARY OF THE INVENTION

According to the present invention to provide a storage apparatus, storage control circuit, and a head-position-displacement measuring method of accurately measuring a position displacement of a write head and a read head without providing a special area even in a storage medium in which a magnetic substance is sectioned in a radial direction.

(Storage Apparatus)

The present invention provides a storage apparatus. The storage apparatus according to the present invention includes:

a storage medium with a configuration of having a plurality of tracks formed of a magnetic-storable magnetic substance, the tracks being sectioned by a non-magnetic substance that does not allow magnetic recording;

a combined-type head having a read head for reading magnetic storage information recorded on the tracks and a write head for writing magnetic storage information on the tracks;

a measurement data recording unit that causes the head to move across a predetermined amount at least equal to or more than one track during one lap of track, with a predetermined radial position and a track position of the storage medium being taken as a recoding start point, thereby writing measurement data in the storage medium while drawing a spiral path;

a measurement data reading unit that causes the head to move, while scanning read-beginning points within a predetermined scanning range from an inner perimeter side including the recording start point of the measurement data recording unit to an outer perimeter side, across the predetermined amount of the measurement data recording unit for each of the read-beginning points, thereby reading the measurement data from the storage medium while drawing a spiral path; and a head-position-displacement detecting unit that finds a distribution of evaluation values within the predetermined scanning range from a measurement data read-back signal obtained by the measurement data reading unit and detects, in the distribution of evaluation values, an amount of position displacement of the read head and the write head on the storage medium in a radial direction for storage.

Here, the measurement data recording unit previously sets a target shift amount obtained by dividing a track width by the number of servo sectors for forming in a track perimeter direction at predetermined spacing and, after starting writing from the recording start point, causes the magnetic head to move in a radial direction by the target shift amount upon each servo-sector detection, thereby writing the measurement data in the storage medium while causing the magnetic head to move across at least one track during one lap of track.

The measurement data reading unit causes, after starting reading from a read-beginning point from which scanning is performed within the predetermined scanning range, the magnetic head to move in the radial direction by the target shift amount upon each servo-sector detection, thereby reading the measurement data from the storage medium while causing the magnetic head to move across at least one track during one lap of track.

The head position displacement detecting unit detects amplitudes of a read-back signal obtained from the measurement data reading unit as the evaluation values, and detects the amount of position displacement from a peak value in a distribution of the amplitudes. In this case, the head-position-displacement detecting unit detects, as the amplitudes of the read-back signal, an average value or an accumulated value of the amplitudes of the read-back signal obtained by reading one spiral path.

The head-position-displacement detecting unit may detect error rates of a read-back signal obtained by the measurement data reading unit as the evaluation values, and detect the amount of position displacement from a bottom peak value in the distribution of the error rates.

In the storage apparatus according to the present invention, the amount of position displacement is detected and stored for each of all track positions of the storage medium by the measurement data recording unit, the measurement data reading unit, and the head-position-displacement detecting unit.

In the storage apparatus according to the present invention, the amount of position displacement may be detected and stored at a plurality of measurement positions on the storage medium in a radial direction by the measurement data recording unit, the measurement data reading unit, and the head-position-displacement detecting unit, and an amount of position displacement at each position other than the measurement positions may be found through an interpolating calculation from amounts of position displacement at measurement positions on both sides.

(Storage Control Circuit)

The present invention provides a storage control circuit of a storage apparatus. The present invention is characterized by the storage control circuit of the storage apparatus provided with a storage medium with a configuration of having a plurality of tracks formed of a magnetic-storable magnetic substance, the tracks being sectioned by a non-magnetic substance that does not allow magnetic recording, and a head having a read head for reading magnetic storage information recorded on the tracks and a write head for writing magnetic storage information on the tracks, the storage control circuit including:

a measurement data recording unit that causes the head to move across a predetermined amount at least more than one track during one lap of track, with a predetermined radial position and a track position of the storage medium being taken as a recoding start point, thereby writing measurement data in the storage medium while drawing a spiral path;

a measurement data reading unit that causes the head to move, while scanning read-beginning points within a predetermined scanning range from an inner perimeter side including the recording start points of the measurement data recording unit to an outer perimeter side, across the predetermined amount of the measurement data recording unit for each of the read-beginning points, thereby reading the measurement data from the storage medium while drawing a spiral path; and a head-position-displacement detecting unit that finds a distribution of evaluation values within the predetermined scanning range from a measurement data read-back signal obtained by the measurement data reading unit and detects, in the distribution of evaluation values, an amount of position displacement of the read head and the write head on the storage medium in a radial direction for storage.

(Measuring Method)

The present invention provides a head-position-displacement measuring method of a storage apparatus. The present invention is characterized by the head-position-displacement measuring method of the storage apparatus provided with a storage medium with a configuration of having a plurality of tracks formed of a magnetic-storable magnetic substance, the tracks being sectioned by a non-magnetic substance that does not allow magnetic recording, and a head having a read head for reading magnetic storage information recorded on the tracks and a write head for writing magnetic storage information on the tracks, the method including:

a measurement data recording step of causing the head to move across a predetermined amount at least equal to or more than one track during one lap of track, with a predetermined radial position and a track position of the storage medium being taken as a recoding start point, thereby writing measurement data in the storage medium while drawing a spiral path;

a measurement data reading step of causing the head to move, while scanning read-beginning points within a predetermined scanning range from an inner perimeter side including the recording start point in the measurement data recording step to an outer perimeter side, across the predetermined amount in the measurement data recording step for each of the read-beginning point, thereby reading the measurement data from the storage medium while drawing a spiral path; and a head-position-displacement detecting step of finding a distribution of evaluation values within the predetermined scanning range from a measurement data read-back signal obtained by the measurement data reading unit and detecting, in the distribution of evaluation values, an amount of position displacement of the read head and the write head on the storage medium in a radial direction for storage.

According to the present invention, even in the case of a storage medium in which a magnetic substance is sectioned in a radial direction, such as discrete tracks or a patterned medium, after recording a measurement pattern with the path of the write head being changed on a spiral, the measurement pattern is read while gradually changing the read-beginning point within the predetermined scanning range in the radial direction, with the path of the read head being changed in a spiral manner similar to that at the time of recording. Therefore, the measurement pattern is always recorded and read through the magnetic area. Thus, a position displacement of the write head and the read head can be accurately measured without providing a special area for detection of head position displacement. The above and other objects, features, and advantages of the present invention will become more apparent from the following detailed description with reference to the drawings.

BRIEF DESCRIPTION OF THE DRAWINGS

FIG. 1 is a drawing for describing recording and reading of measurement patterns in a conventional head-position-displacement measuring process;

FIGS. 6A and 6B are block diagrams of a magnetic disk apparatus representing one embodiment of a storage apparatus according to the present invention;

FIG. 7 is a drawing for describing a mechanical structure of the magnetic disk apparatus according to the present invention;

FIG. 9 is a drawing for describing contents of a control table of FIGS. 6A and 6B that stores position-displacement measurement results according to the present embodiment;

DETAILED DESCRIPTION OF THE PREFERRED EMBODIMENTS

Figure 2A:
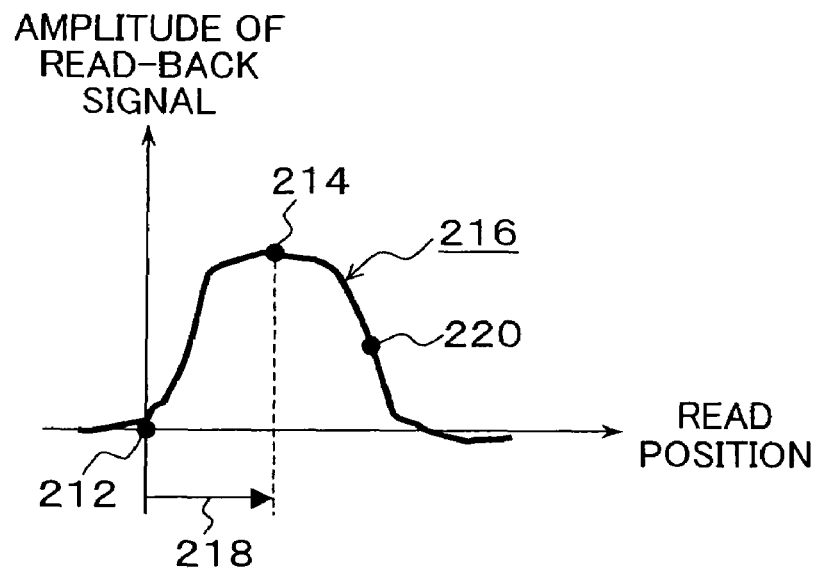
FIGS. 2A and 2B are drawings for describing a profile of an amplitude of a read-back signal generated in the measurement-pattern read process of FIG. 1 with respect to a read position and the amplitude of the read-back signal for one track.
Figure 2B:
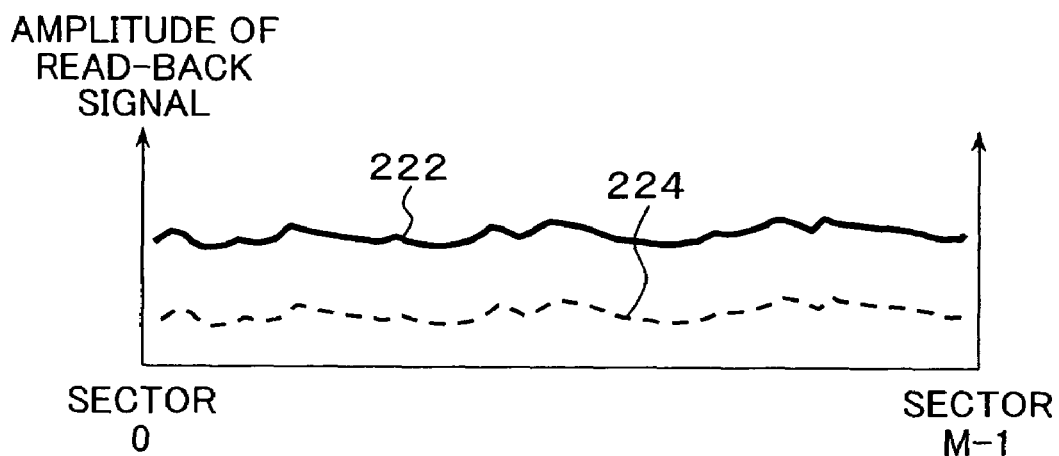
Figure 3:
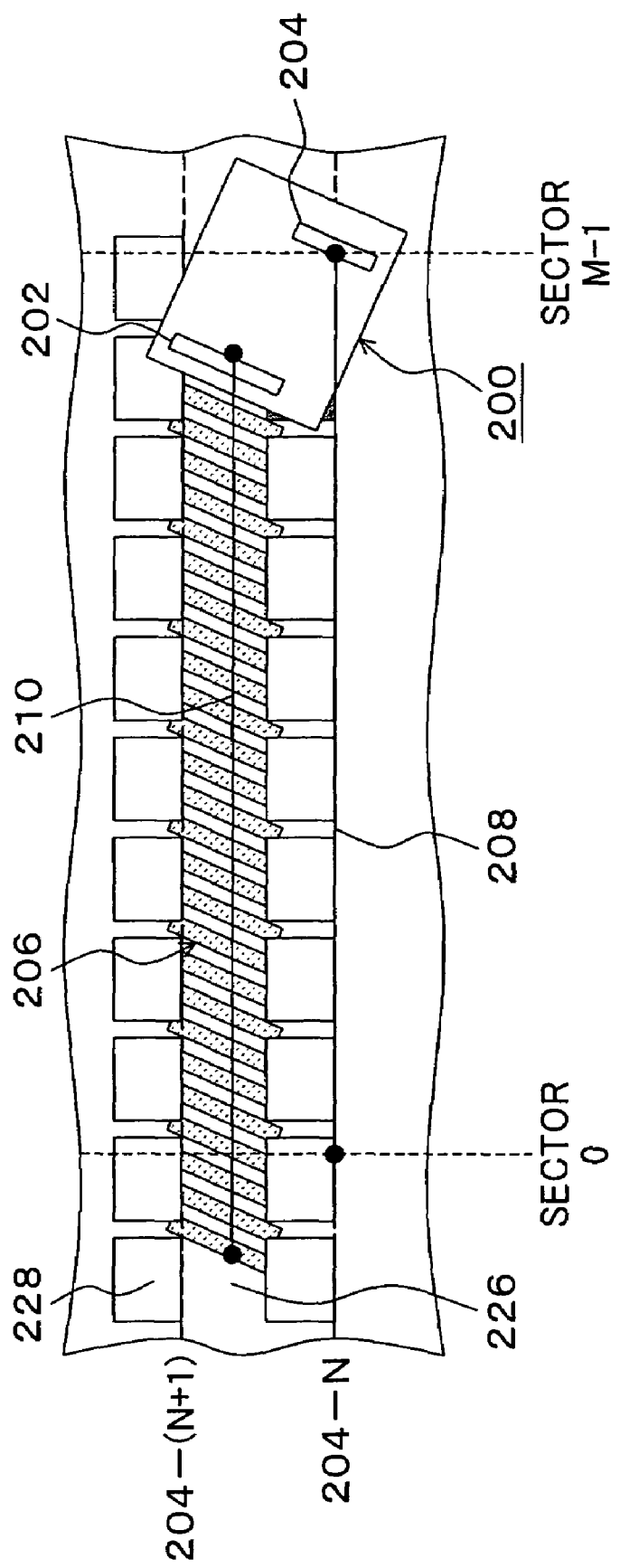
FIG. 3 is a drawing for describing recoding and read of measurement patterns in conventional head-position-displacement measuring process targeted for a discrete-track storage medium.
Figure 4:
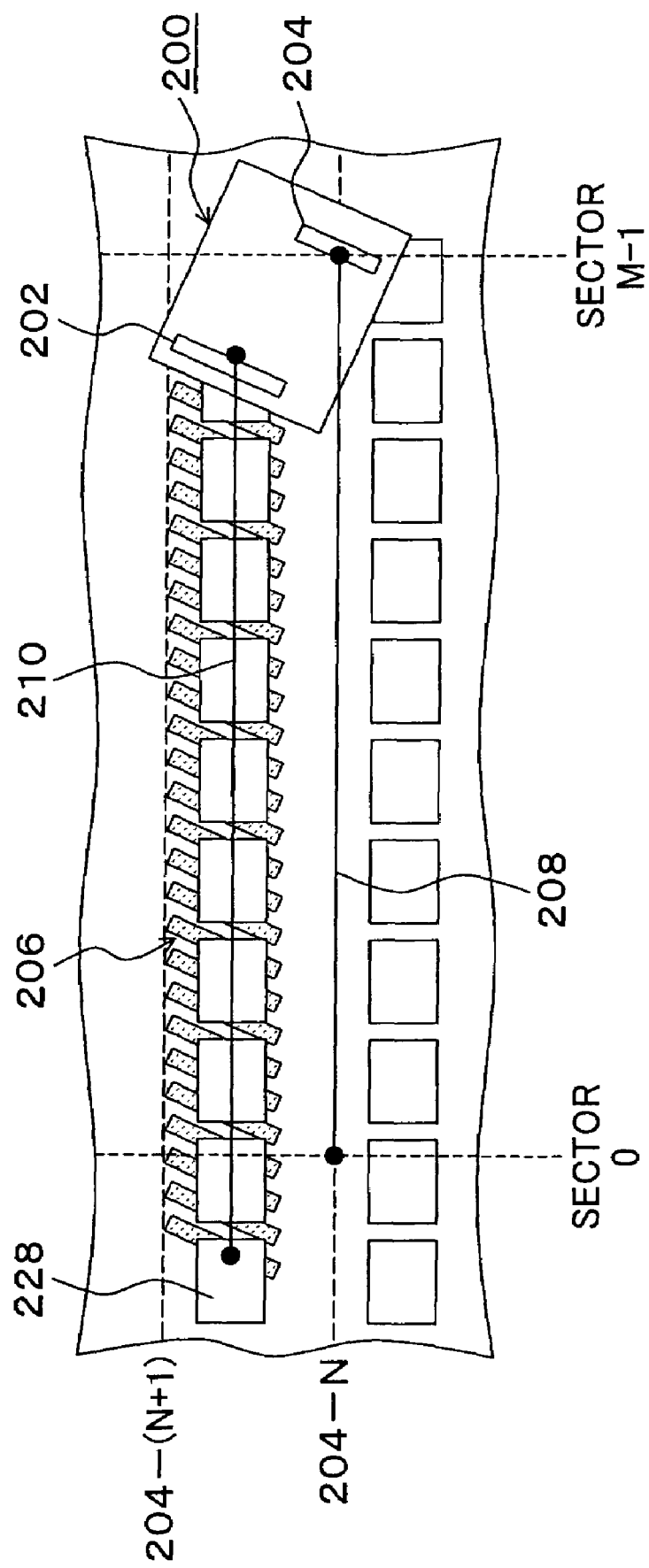
FIG. 4 is a drawing for describing case in which measurement patterns are recorded on non-magnetic area of discrete-track storage medium.
Figure 5A:
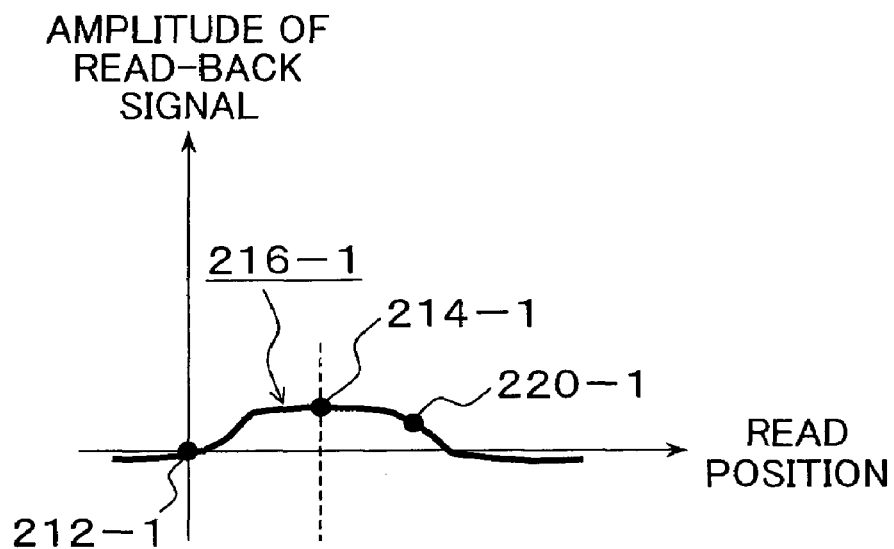
FIGS. 5A and 5B are drawings for describing a profile of an amplitude of a read-back signal generated in the measurement-pattern read process of FIG. 4 with respect to a read position and the amplitude of the read-back signal for one track.
Figure 5B:
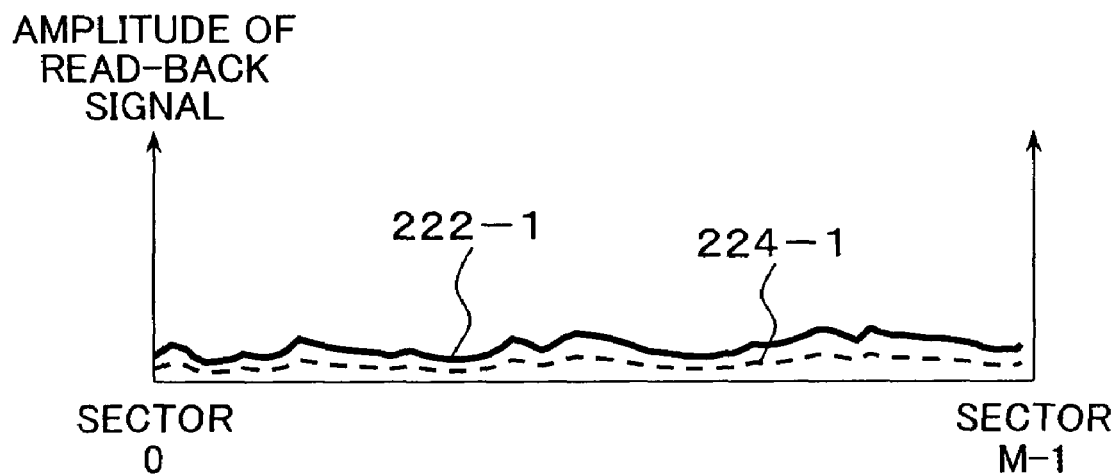
Figure 6A:
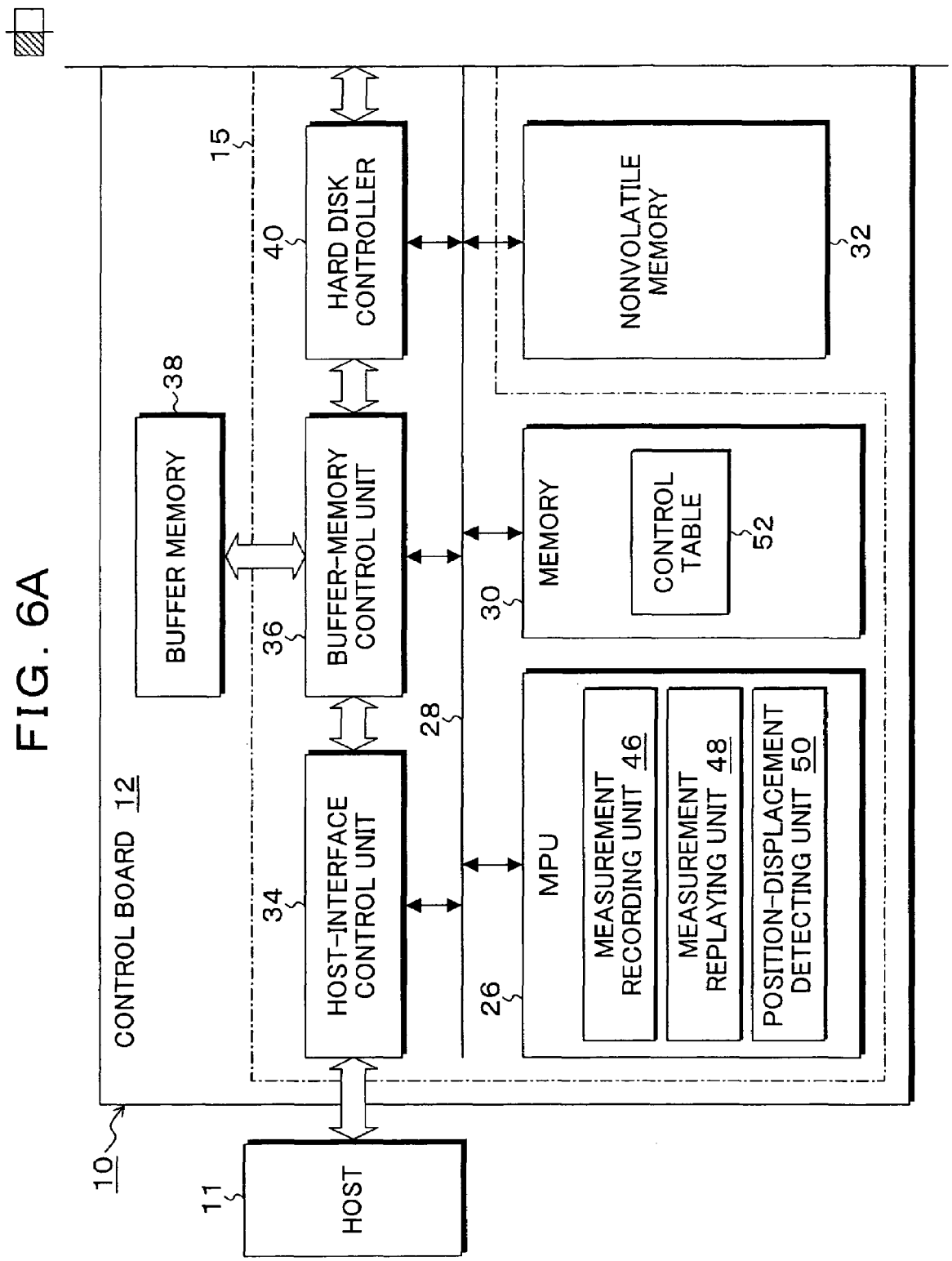

FIGS. 6A and 6B are block diagrams of a magnetic disk apparatus representing one embodiment of a storage apparatus to which a head-position-displacement measuring process according to the present invention. In FIGS. 6A and 6B, a magnetic disk apparatus 10 known as a hard disk drive (HDD) is configured of a control board 12 and a disk enclosure 14. The disk enclosure 12 is provided with a spindle motor 16. The spindle motor 16 has a rotational shaft into which magnetic disks 20-1 and 20-2 are inserted to be rotated at a constant speed, for example, 4200 rpm. The magnetic disks 20-1 and 20-2 according to the present embodiment use a discrete-track medium or a patterned medium having a configuration in which a plurality of tracks formed of a magnetic substance are sectioned by a non-magnetic substance that does not allow magnetic recording. The disk enclosure 14 is provided with a voice coil motor 18. The voice coil motor 18 has heads 22-1 to 22-4 mounted at the tip of an arm of a head actuator to position the heads with respect to medium recording surfaces of the magnetic disks 20-1 and 20-2. The heads 22-1 to 22-4 are combined-type heads each having a write head and a read head being integrated together. As the write head, a longitudinal-magnetic-recording-type write head or a vertical-magnetic-recording-type write head is used. In the case of the vertical-magnetic-recording-type write head, as the magnetic disks 20-1 and 20-2, vertical storage media provided with a recording layer and a soft-magnetic protective layer are used. As a read head, a GMR element or a TMR element is used. The heads 22-1 to 22-4 are signal-line-connected to a head IC 24. The head IC 24 selects either one of the heads for writing or reading with a head select signal based on a write command or a read command from a host 11 as an upper-level apparatus. Also, the head IC 24 is provided with a write amplifier in a write system and a preamplifier in a read system. The control board 12 is provided with an MPU 26. A bus 28 for the MPU 26 is provided with a memory 30 that stores a control program and control data using a RAM and a non-volatile memory 32 that stores a control program using an FROM or the like. Also, the bus 28 for the MPU 26 is provided with a host interface control unit 34, a buffer memory control unit 36 that controls a buffer memory 38, a hard disk controller 40 that functions as a formatter, a read channel 42 that functions as a write modulating unit and a read demodulating unit, and a motor-driving control unit 44 that controls the voice coil motor 18 and the spindle motor 16. Furthermore, the MPU 26, the memory 30, the non-volatile memory 32, the host-interface control unit 34, the buffer-memory control unit 36, the hard disk controller 40, and the read channel 42 form a storage control circuit 15. The storage control circuit 15 is achieved by one LSI circuit. The magnetic disk apparatus 10 performs a recording process and a reading process based on a command from the host 11. Here, a normal operation in the magnetic disk apparatus is described as follows. When a write command and write data from the host 11 are received at the host-interface control unit 34, the write command is decoded at the MPU 26, and the received write data is stored in the buffer memory 38 as required and is then converted at the hard disk controller 40 to a predetermined data format. Also, an ECC code is added through an ECC encoding process. After scrambling, RLL code transformation, and further write compensation are performed in a write modulation system in the read channel 42, writing is performed from, for example, a write head of the head 22-1 selected from the write amplifier via the head IC 24 to the magnetic disk 20-1. At this time, a head positioning signal is given from the MPU 26 to the motor-driving control unit 44. From the voice coil motor 18, after seeking of a target track indicated by the command with the head, on-track control is performed. On the other hand, when a read command from the host is received at the host-interface control unit 34, the read command is decoded at the MPU 26. After a read-back signal read from the read head selected through head selection of the head IC 24 is amplified by the preamplifier, the read-back signal is input to a read demodulation system in the read channel 42. Read data is demodulated through partial response maximum-likelihood detection (PRML) or the like. After an ECC decoding process is performed at the hard disk controller 40 to correct errors, the read data is buffered to the buffer memory 38, and the read data is transferred from the host-interface control unit 34 to the host. At the time of a read process, in on-track following control after seeking the target track, a position correction control is performed such that the position displacement of the read head is corrected with the amount of read head position displacement from the control table 52 and the read head is positioned at a track position from which a maximum read amplitude can be obtained. The magnetic disk apparatus 10 according to the present embodiment performs a head position displacement measuring process of measuring the amount of position displacement of the write head and the read head provided to the heads 22-1 to 22-4 by using testing equipment or the like in the stage where assembling the apparatus is completed and storing the amount in the control table 52. With the magnetic disk apparatus 10 being connected, the host 11 as the testing equipment downloads measurement firmware (program) for measuring a head position displacement to the memory 30. The MPU 26 executes the measurement firmware downloaded to the memory 30, thereby achieving the functions of the measurement recording unit 46, the measurement reading unit 48, and the position displacement detecting unit 50 to execute a process of detecting the amount of head position displacement and storing the amount in the control table 52. The measurement recording unit 46 causes each of the heads 22-1 to 22-4 to move across a predetermined amount at least equal to or more than one track in a radial direction during one lap of track, with a predetermined radial position and a track position (for example, servo sector with an index=0) on a storage medium surface of each of the magnetic disks 20-1 and 20-2 being taken as a recording start point, thereby writes measurement data while drawing a path in a spiral manner. The measurement reading unit 48 causes, for each of the heads 22-1 to 22-4, within a predetermined scanning range from an inner perimeter side including the recording start point of the measurement recording unit 46 to an outer perimeter side, the track to move in a radial direction by a predetermined amount equal to the amount in the measurement recording unit 46 for each read-beginning point while sequentially shifting the read-beginning point in a radial direction, thereby reading a measurement pattern written in the magnetic disks 20-1 and 20-2 as measurement data while drawing a spiral path. The position displacement detecting unit 50 finds a profile, which is a distribution of evaluation values, such as, for example, amplitudes of a read-back signal or error rates, obtained from a read-back signal in the predetermined scanning range in which the read-beginning point is set, the profile being found from the read-back signal through reading the measurement pattern obtained by the measurement reading unit 48. From this profile of the evaluation values, the amount of position displacement of the read head and the write head in the radial direction on the storage medium surface is detected, and is stored in the control table 52. In such detection of head position displacement, a measurement process is performed while sequentially selecting one of four heads 22-1 to 22-4, with all tracks or a plurality of predetermined tracks on the storage medium surface of a corresponding one of the magnetic disks 20-1 and 20-2 for each head being taken as target tracks. Here, when measurement of the amount of head position displacement is performed on part of the tracks on the storage medium surface, a position displacement of tracks not to be measured is calculated through interpolation calculation for the measured positionally-displaced head, and is then stored in the control table 52 or, interpolation calculation is performed every time a head position displacement is corrected, as described below. After the process of measuring the head position displacement is finished, the measurement firmware downloaded from the host 11 to the memory 30 is deleted. Therefore, in the MPU 26, the functions of the measurement recording unit 46, the measurement reading unit 48, and the position displacement detecting unit 50 are deleted. With the stop and end process of the apparatus, the control table 52 in the memory 30 with the detected amount of head position displacement is written and stored in a non-volatile manner in the most-outer system area on a medium recording surface of, for example, the magnetic disk 20-1 corresponding to the head 22-1. Then, when power is turned on with the apparatus connected to the host 11 of the user, the magnetic disk apparatus 10 is activated. At the time of an initial process at activation, the control table 52 is read by the head 22-1 from the system area of the storage medium surface of the magnetic disk 20-1, and is disposed on the memory 30 as depicted. In the MPU 26, in a read process at the time of receiving a read command from the host 11, when the target track is sought by the head 22-1 for on-track following control, the amount of head position displacement corresponding to the target track is read from the control table 52 of the memory 32. The VCM 18 is then driven for position displacement correction so as to eliminate the amount of head position displacement. With this, a positioning control is performed on the head so that the head is placed at a position where the read-back signal is maximum with respect to the recording pattern of the target track or a position where an error rate is minimum.

FIG. 7 is a drawing for describing an internal structure of the magnetic disk apparatus according to the present embodiment. In FIG. 7, the magnetic disk apparatus according to the present embodiment has disposed on a base 54 the magnetic disks 20-1 and 20-2 rotating at a predetermined speed by the spindle motor 16. For the magnetic disks 20-1 and 20-2, an actuator 56 rotatably supported by a shaft unit 58 is disposed. The actuator 56 has the head 22-1 disposed at its arm tip, and also has a coil provided on an opposite side of the arm and rotatably disposed in a yoke 60 vertical disposed to be fixed to the base 54 to have a permanent magnet inserted therein. The magnetic disks 20-1 and 20-2 rotated by the spindle motor 16, as their storage medium surfaces being extracted to be shown in an enlarged manner to the outside, have the configuration of a discrete track 62 or a patterned medium 68. The discrete track 62 has a track portion as a magnetic area 64. On both sides of a track as this magnetic area 64, non-magnetic areas 66 are disposed. On the other hand, in the case of the patterned media 68, magnetic areas 70 are disposed in a track boundary portion and an area sectioning in a track direction and non-magnetic areas 72 are disposed taking charge in a track direction and a track width direction.

Figure 8:
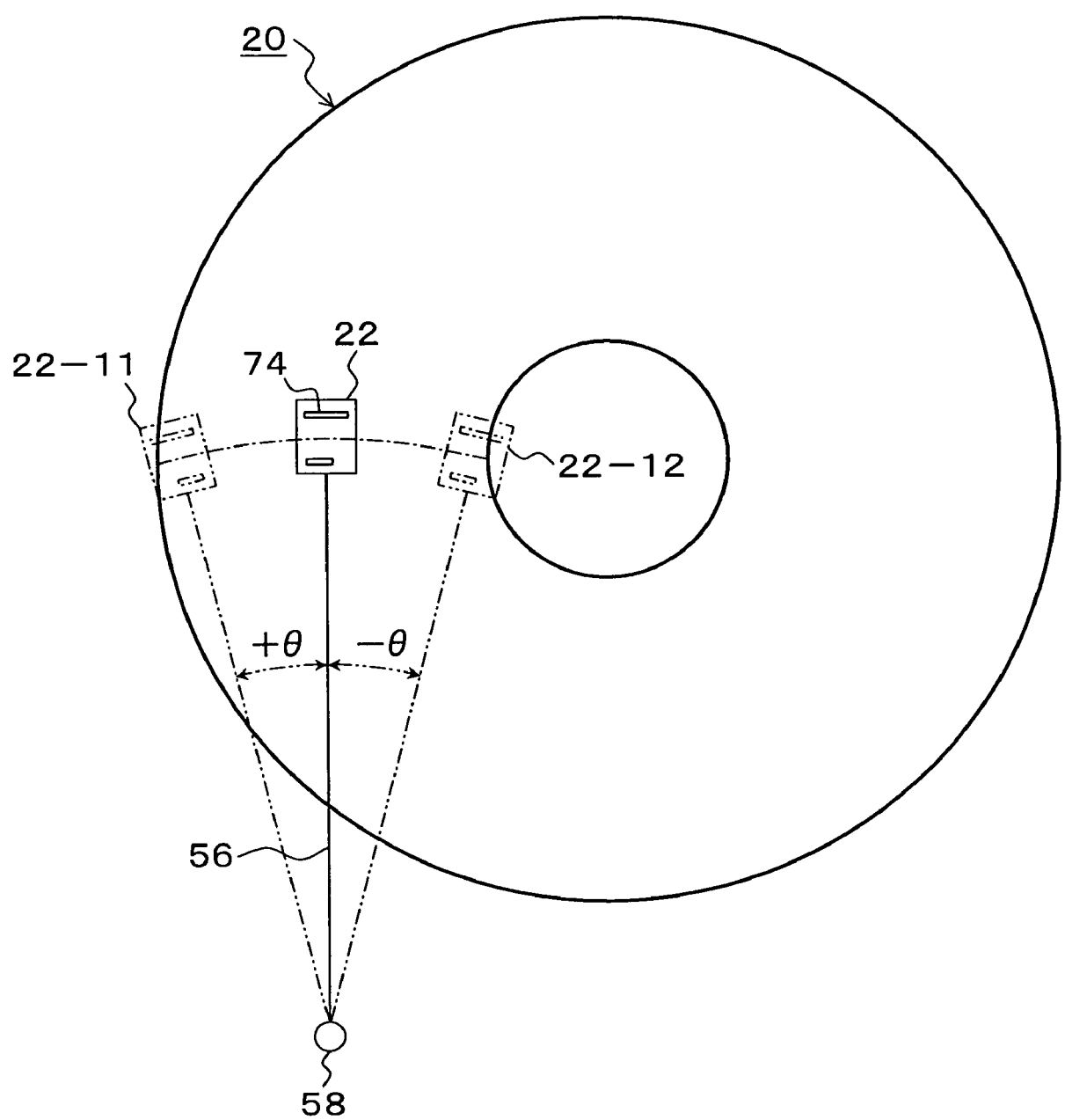
FIG. 8 is a drawing for describing a state of head position displacement when a head is moved with respect to a magnetic disk.

FIG. 8 is a drawing for describing a state of head position displacement when the head is moved with respect to the magnetic disk in the present embodiment. In FIG. 8, to the magnetic disk 20, as depicted in FIG. 7, the actuator 56 is rotatably provided about the shaft unit 58, and the head 22 is mounted at the tip of the actuator 56. The head 22 is provided with a write head 74 and a read head 76, and both are positionally displaced in a track radial direction due to an error in manufacturing process. The head 22 provided with the write head 74 and the read head 76 having a position displacement is moved in a radial direction with respect to the storage medium surface of the magnetic disk 20 by the actuator 56, a yaw angle θ=0 is formed at the center position at which the axial direction of the actuator 56 corresponds to a track direction. At this position of θ=0, the position displacement of the write head 74 and the read head 76 with respect to the track radial direction (not including an error at the time of manufacturing process) is minimum. On the other hand, at the position where a yaw angle θmax or +θmax at which the head 74 is moved by the actuator 56 to the position of a head 22-11 on the most outer side or the position of a head 22-12 on the most inner side, the position displacement of the write head 74 and the read head 76 with respect to the track radial direction (not including an error at the time of manufacturing process) is maximum. Therefore, in measuring the amount of head position displacement according to the present embodiment, the amount of head position displacement is measured at two positions, that is, at least the position of the most-outer head 22-11 and the position of the most-inner head 22-12, and at positions therebetween, the amount has to be found through an interpolating calculation. Here, the amount of most-outer head position displacement and the amount of most-inner head position take values varied in opposite directions, that is, plus side and minus side, with respect to the amount of position displacement of the head at the center position of the yaw angle θ=0.

FIG. 9 is a drawing for describing the control table 52 of FIGS. 6A and 6B that stores the position-displacement measurement results according to the present embodiment. In FIG. 9, the control table 52 has set therein head numbers, cylinder addresses, and amounts of position displacement. The head numbers are set as HH01 to HH04 corresponding to the four heads 22-1 to 22-4 of FIGS. 6A and 6B. The cylinder addresses correspond to track addresses at which the heads 22-1 to 22-4 are positioned, and when the total number of tracks is taken as n, the cylinder addresses are as CC1 to CCn. In the present embodiment, as the amounts of head position displacement of the target tracks each specified by the head number and the cylinder address, OFF1 to OFF4n are obtained through a head position displacement measuring process, and are then stored in the control table 52 as depicted in the drawing. As a matter of course, as for values of the amount of position displacement stored in the control table 52, after the values measured at a plurality of track positions in the radial direction including the most outer and most inner positions are registered, as for the positions therebetween, the amount of displacement found through the interpolating calculation may be stored as a measurement value on both sides, and the amount of displacement for all tracks may be measured to be stored.

Figure 10A:
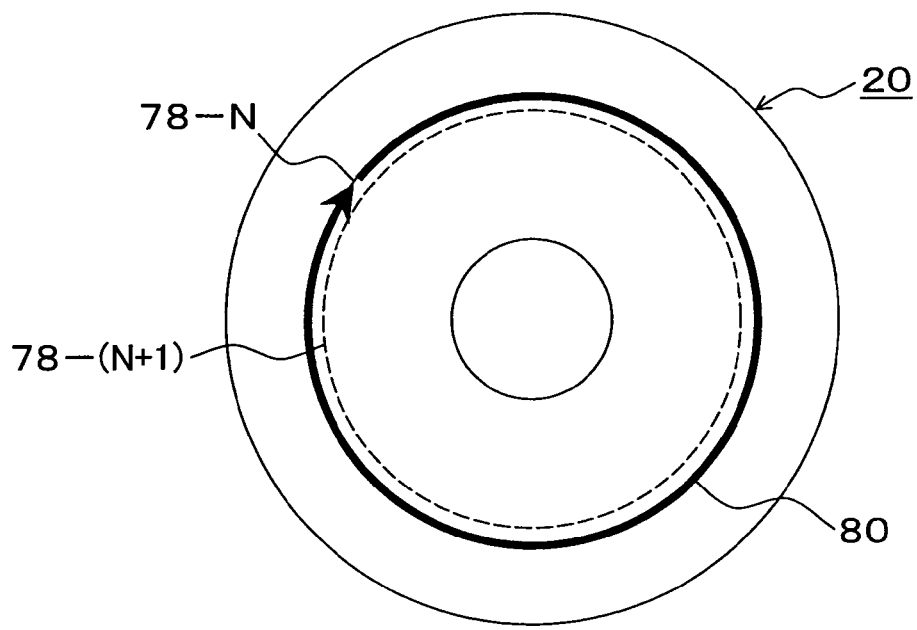
FIGS. 10A and 10B are drawings for describing head paths at the time of normal recording/reading and at the time of measurement recording/reading in the present embodiment.
Figure 10B:
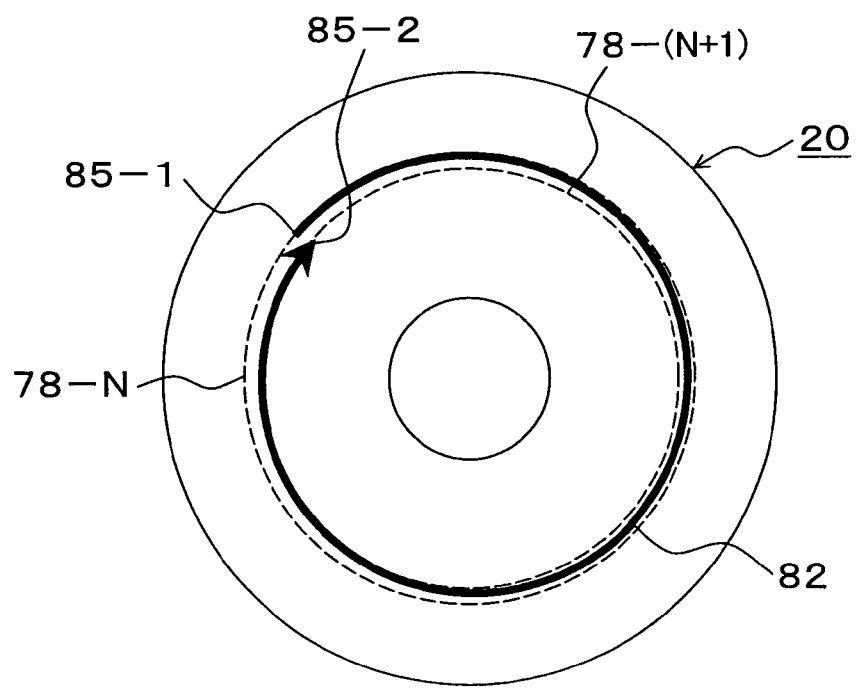

FIGS. 10A and 10B are drawings for describing head paths at the time of normal recording/reading and at the time of recording/reading for head position displacement measurement in the present embodiment. FIG. 10A depicts a head path at the time of normal recording/reading. For example, when data is written in a track 78-N, a servo sector set at predetermined spacing in a track direction is read by the read head to demodulate a position signal, and the position of the track 78-N is sought for on-track, thereby performing data recording or reading on the storage medium surface while drawing a circular head path 80 along the track 78-N.

FIG. 10B depicts a read path at the time of head position measurement according to the present embodiment. In the present embodiment, with the track 78-N of the magnetic disk 20 being sought as the target track for on-track, a servo sector having a sector number=0 with which an index can be obtained is taken as a recording or read-beginning point 85-1. A control is performed such that, while the magnetic disk 20 is rotated once, the head is moved across, for example, an inner track 78-(N+1), thereby drawing a head path 82 in a spiral manner from a start point 85-1 of the track 78-N to an end point 85-1 of a track 78-(N+1).

Figure 11:
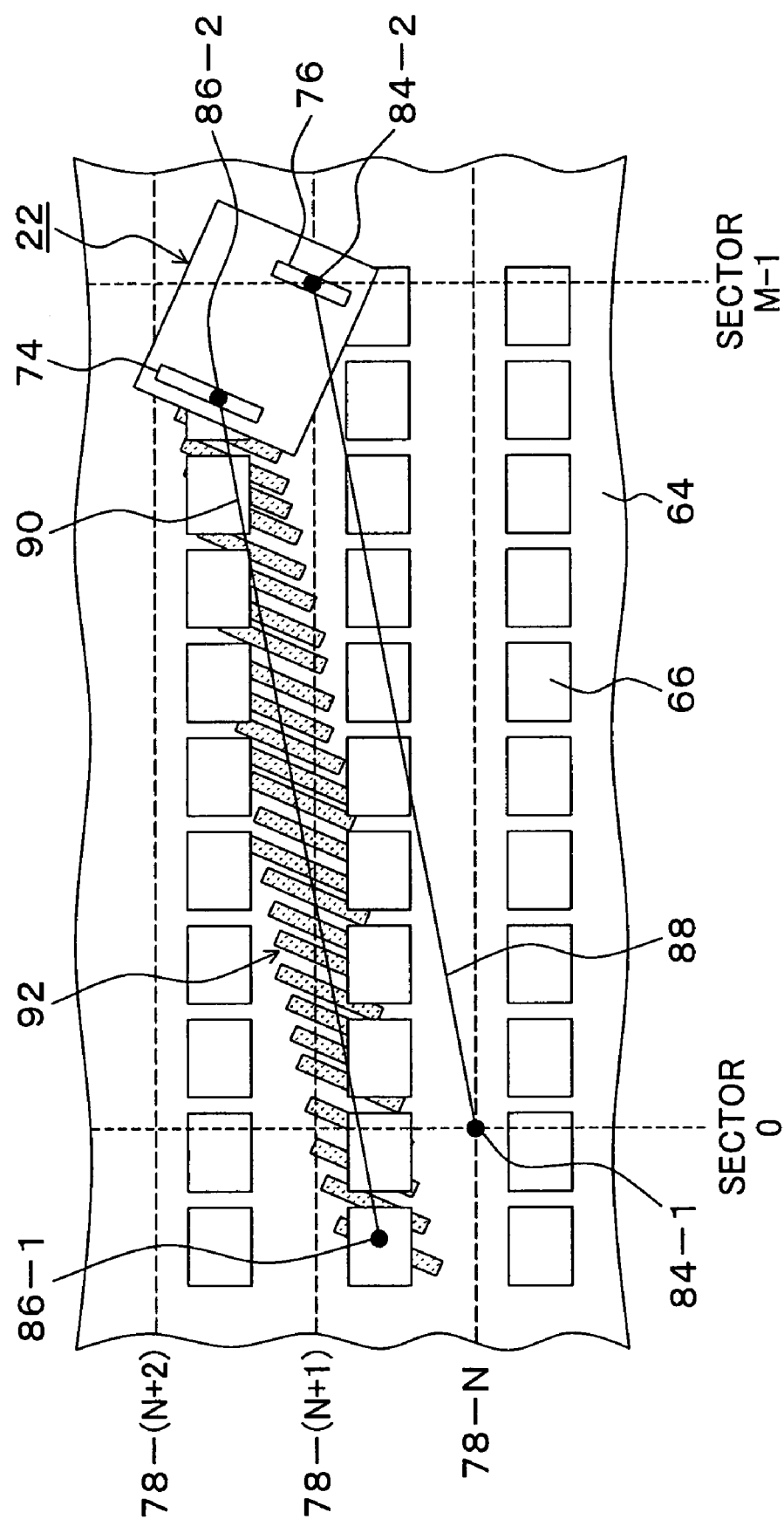
FIG. 11 is a drawing for describing a process of recording a measurement pattern to a storage medium in the present embodiment.

FIG. 11 is a drawing for describing a process of recording a measurement pattern to the storage medium in the present embodiment. In FIG. 11, when a discrete track is taken as a storage medium by way of example, and three tracks, that is, tracks 78-N, 78-(N+1), 78-(N+2) are taken out for one disk rotation. The magnetic area 64 is disposed in a track recording area, whilst the non-magnetic area 66 is disposed at a track boundary portion. Here, although the non-magnetic area 66 is sectioned herein, this may be successive non-magnetic areas.

Here, the magnetic disk has formed thereon servo sectors at predetermined spacing in a track direction of the storage medium surface. The number of servo sector is M, for example. Therefore, in FIG. 11, a track for one rotation from sector number=0 to sector number=M−1 of the servo sectors is shown. For head position measurement of such a storage medium, a measurement pattern 92 is first written with the track 78-N as a target track. Writing of the measurement pattern 92 is performed in a manner such that, with the target track 78-N being sought with the read head 76 provided to the head 22 for on-track, when the sector number=0 of the servo sector being read by the read head 76 is detected, reaching to a read-beginning point 84-1 is determined, thereby starting writing the measurement pattern 92 by the write head 74 from a recording start point 86-1. Then, from the read-beginning point 84-1 to the sector (M−1) for track one rotation, the head 22 is shifted by one M-th of one track width in a radial direction, that is, in a track 78-(N+1) direction. With this, the head path 82 in a spiral manner depicted in FIG. 10B, that is, in the case of linearization in FIG. 11, a read path 88 represented by a straight line from a read-beginning point 84-1 to a read-finishing point 84-2 for the read head 76 is obtained. At the same time, for the write head 74, a straight-line recording path 90 from a recording start point 86-1 to a recording end point 86-2 is obtained. The measurement pattern 92 is recorded in a straight-line manner, actually, in a spiral manner, along a recoding path 90 by the write head 74 from the track 78-N through the track 78-(N+1) toward the track 78-(N+2). In recording of this measurement pattern 92, in the present embodiment, since this is the case of a discrete track, the non-magnetic area 66 is disposed at each boundary portion of the track area. With the recording pattern 92 being recorded in a spiral manner so as to go across a track pitch at one rotation in the track direction. Therefore, even if the non-magnetic area 66 is present at a track boundary portion, the measurement pattern 92 can be reliably recorded so as to always go over the magnetic area 64 during one cycle of track.

Figure 12:
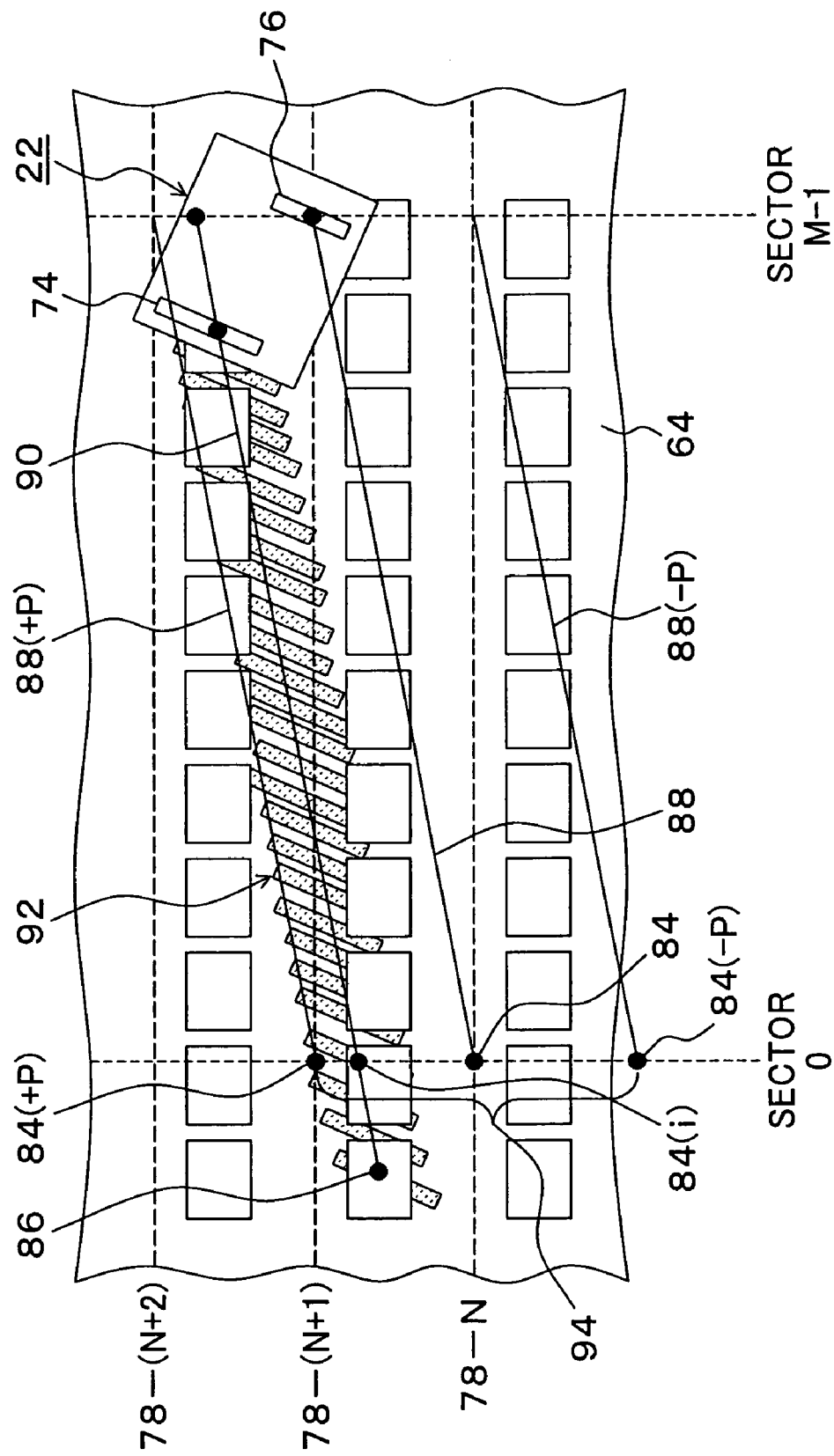
FIG. 12 is a drawing for describing a process of reading a measurement pattern from the storage medium in the present embodiment.
Figure 13A:
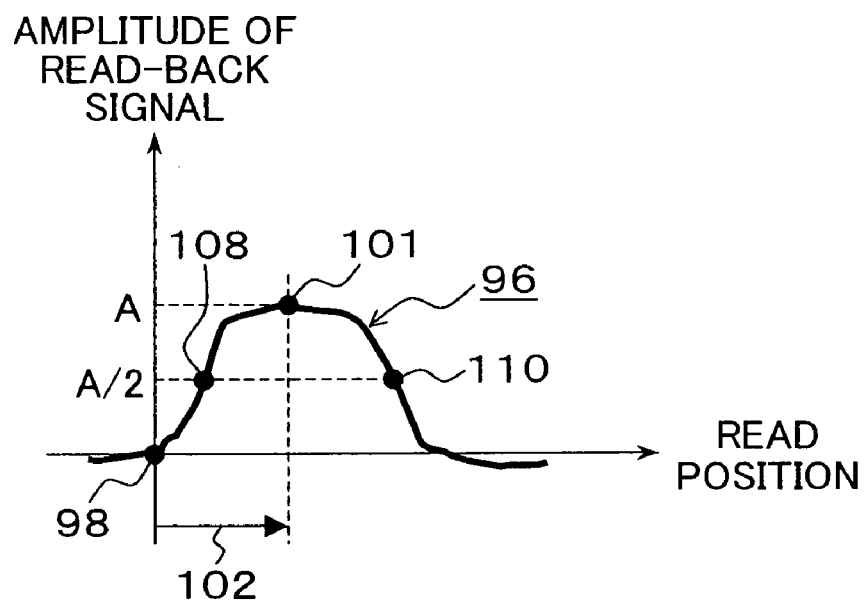
FIGS. 13A and 13B are drawings for describing a profile of an amplitude of a read-back signal generated in the measurement-pattern reading process of FIG. 12 with respect to a read position and the amplitude of the read-back signal for one track.
Figure 13B:
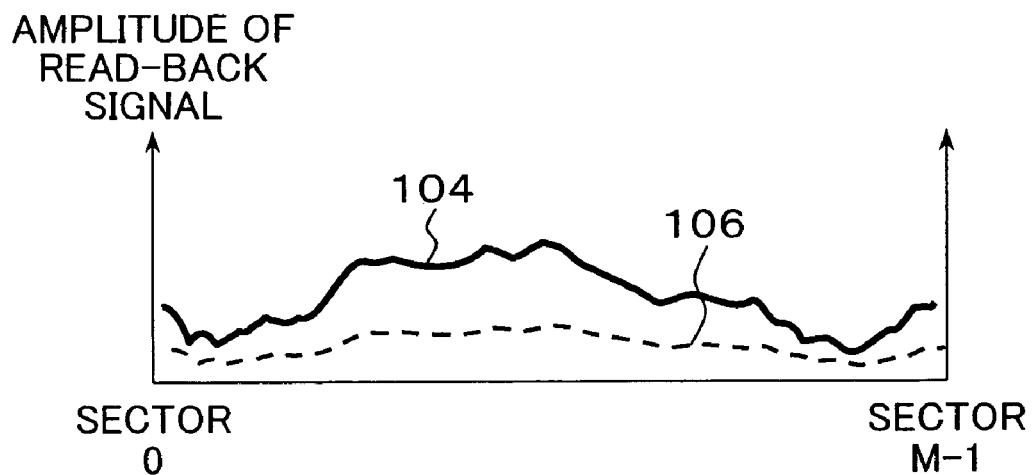

FIG. 12 is a drawing for describing a process of reading the measurement pattern from the storage medium in the present embodiment. In a manner as depicted in FIG. 11, reading the measurement pattern 92 recorded in a spiral manner from the track 78-N to the track 78-(N+1), with a read-beginning point 84 of the read head 76 at the time of recording being taken as a center, a scanning range 94 with predetermined offset values +P and −P are set in a radial direction. Then, as for the scanning range 94, scanning is performed in a spiral manner in a track direction while scanning in which the read-beginning point of the read head 76 is gradually moved in a predetermined direction, the measurement pattern 92 is read. Specifically, the read-beginning point 84 (−P) that is offset by −P with respect to the read-beginning point 84 at the time of recording is sought with the read head 76 for on-track. With this state, reading is started when the sector number=0 of the servo sector is detected. Then, reading is performed while shifting the point to a plus side by one M-th of one track width every time a servo sector is detected, thereby moving the read head 76 along the reading path 88 (−P). That is, as in FIG. 10B, the read head 76 is moved along the head path 80 in a spiral manner. A read-back signal obtained through movement of the read head 76 along the reading path 88 (−P) is sampled to store a sample value for one cycle of track in the memory 30. Then, the read head 76 is moved in a spiral manner at each operation start point while gradually shifting from the read-beginning point 84 (−P) to a plus side at predetermined spacing to the read-beginning point 84 (+P), thereby sampling amplitudes of the read-back signal for one cycle of track of the measurement pattern 92 and storing the results in the memory 30. In this manner, when the reading process through sequential scanning of the scanning range 94 is finished, a profile 96 representing a signal distribution of, as signal evaluation values, amplitudes of the read-back signal with respect to the read positions is generated as shown in FIG. 13A. The profile 96 represents values as depicted in FIG. 13B, found as average values or accumulation values of sampled values for one cycle, in an exemplary case of the read-back signal amplitude 104 at the peak and the read-back signal amplitude 106 at ½ peak obtained through a measurement-pattern reading process. The profile 96 of the amplitudes of the read-back signal with respect to the read position of FIG. 13A represents values obtained, as depicted by a recording path in FIG. 12, through movement of the read head 76 along a plurality of spiral paths with the scanning range 94 being taken as a read-beginning point. Among these, read along the recording path 90 passing the center of the measurement pattern 92 is performed. Therefore, although the read-back signal amplitude is small on sector 0 and sector M−1 sides as depicted in the read-back signal amplitude 104 of FIG. 13B, sufficient amplitude values can be obtained as depicted in the read-back signal amplitude 104 at the center portion where the measurement pattern is present in the magnetic area 64, thereby allowing a read-back peak value 101 to be accurately found as for the profile 96 obtained as average values or accumulation values. As long as the peak point 101 of the profile 96 is detected, an offset value 102 from write position 98 to the peak point 101 at the time of the measurement record in FIG. 11 can be accurately detected as the amount of displacement of the write head 74 and the read head 76 on the track 78-N in the radial direction. Here, as for the scanning range 94, +P and −P values can be defined based on a maximum value of position displacement of the write head and the read head, the value that can be assumed in head manufacturing process.

Figure 14:
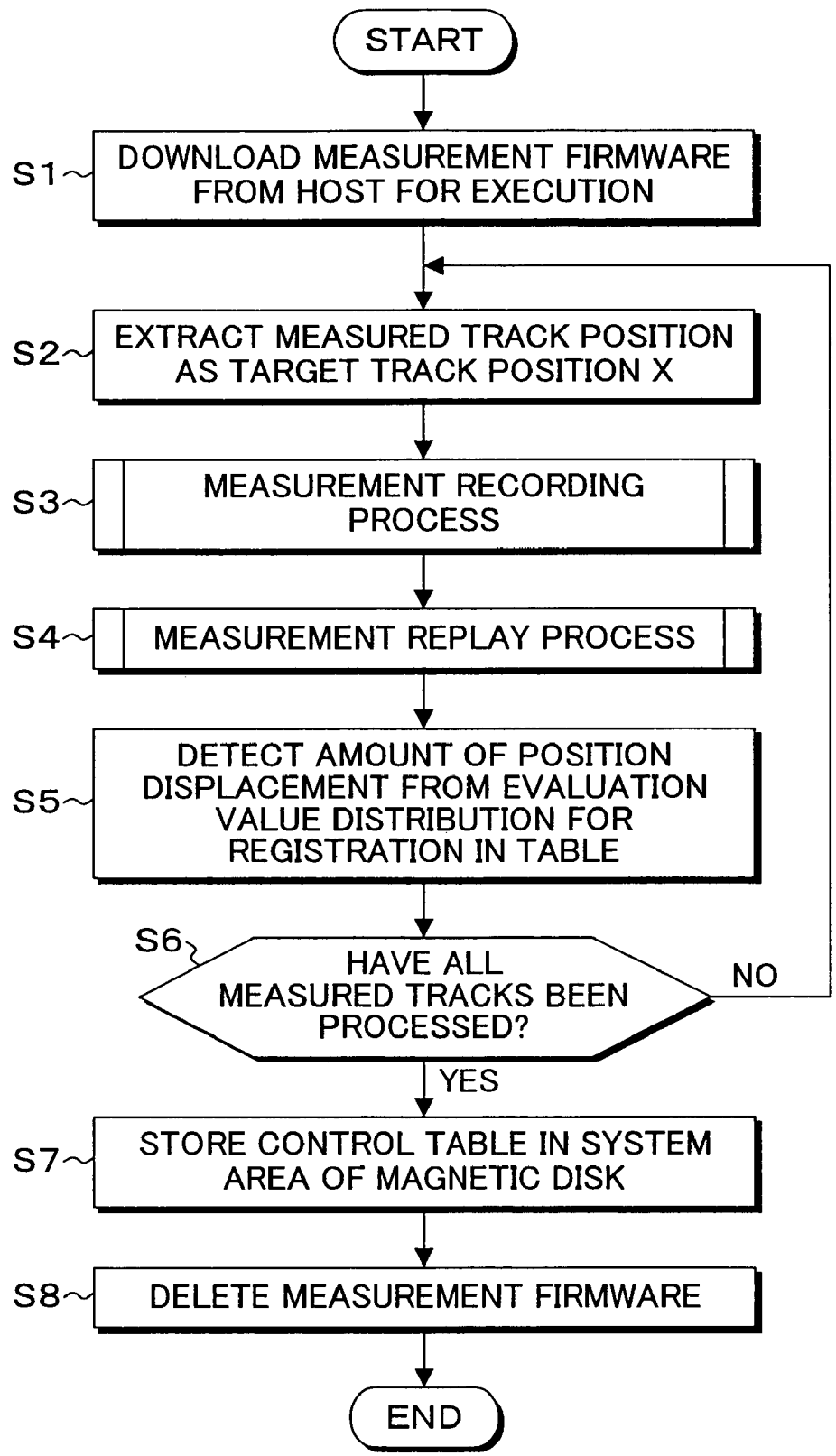
FIG. 14 is a flowchart depicting a procedure of measuring a head position displacement according to the present embodiment.

FIG. 14 is a flowchart of a procedure of measuring a head position displacement according to the present embodiment, and is described as follows with reference to FIGS. 6A and 6B. In FIG. 14, at step S1, measurement firmware is downloaded from the host 11 for use in testing equipment to the memory 30 of the magnetic disk device 10, and is executed by the MPU 26. With this, the functions of the measurement recording unit 46, the measurement reading processing unit 48, the position-displacement detecting unit 50 provided to the MPU 26 become effective. Then at step S2, a measurement track position is extracted as a target track position X. Specifically, from the control table 52 disposed in the memory 30, a head number and a cylinder address are sequentially extracted. At this stage, the control table 52 has set therein only the head number and the cylinder address depicted in FIG. 9, and the area of the amount of position displacement is blank. Next according to the measurement recording unit 46 at step S3, as shown in FIG. 11, the target track position X is sought with the head for 22 on-track, and the head is moved across tracks during one cycle of track, thereby writing the measurement pattern in a spiral manner. Next at step S4, as depicted in FIG. 12, the scanning range 94 is set in the radial direction to the measurement pattern 92 written in a spiral manner, and the head is sequentially moved to go across one track for one cycle of track, thereby reading the measurement pattern with a head path in a spiral manner. Then at step S5, the position-displacement detecting unit 50 finds the profile 96 of the amplitudes of read-back signal with respect to the read position as depicted in FIG. 13A, for example. The offset value 102 is then found from the read position of the peak 101 in the profile 96, and is stored as a corresponding amount of position displacement in the control table of FIG. 9. In detecting the peak point 101 of the profile 96 in FIG. 13A at step S5, when the peak point 101 is difficult to specify from the waveform of the profile 96, read positions of points 108 and 110 crossing A/2, which are each a half amplitude of an amplitude A of the peak 101, are found, and these ½ read positions of the two read positions are found as offset values 102 of the peak point 101. Then at step S6, it is checked whether all measurement tracks set in the control table 52 have been processed. If not yet processed, the procedure returns to step S2, extracting the next measurement track as a target track X and repeating a similar process. If it is determined at step S6 that all measurement tracks have been processed, the control table 52 is stored in a system area of the magnetic disk at step S7. Here, if the non-volatile memory 32 has a sufficient capacity, the control table 52 may be stored in the non-volatile memory 32. Then at step S8, the measurement firmware not required any longer due to the end of the head position displacement measurement is deleted from the memory 30. With this, a series of processes ends. Here, it is possible to hand over the magnetic disk apparatus 10 to the user while keeping the measurement firmware stored in the magnetic disk without deleting the measurement firmware as at step S8. In such a case, if a fault occurs due to the amount of head position displacement while the user is using the magnetic disk apparatus 10, it is possible to execute the installed measurement firmware and newly create the control table 52 for the amount of head position displacement on the user side.

Figure 15:
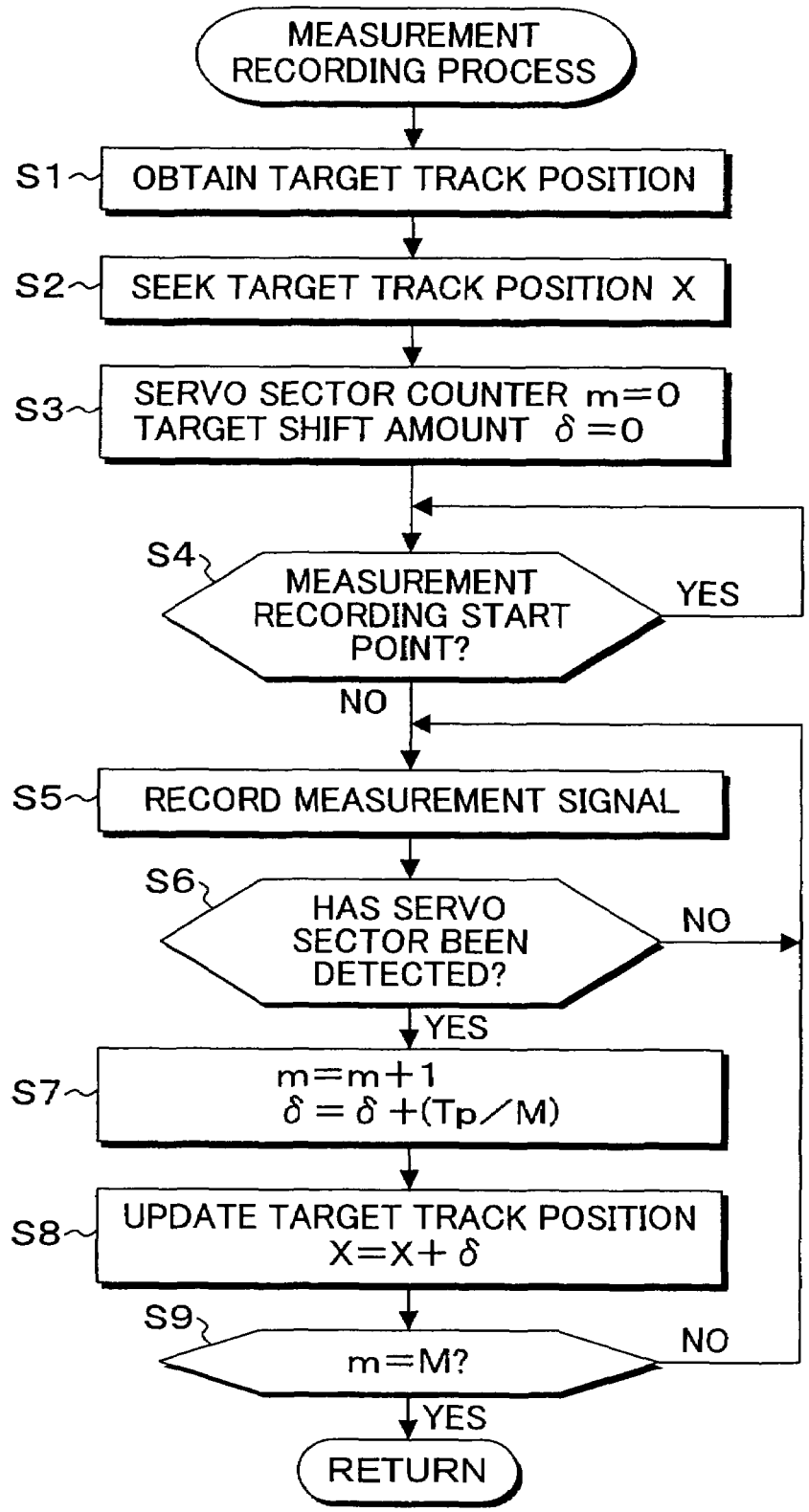
FIG. 15 is a flowchart depicting details of the measurement recording process at step S3 of FIG. 14.

FIG. 15 is a flowchart depicting details of the measurement recording process at step S3 of FIG. 14, and is described with reference to FIG. 11 as follows. In FIG. 15, in the measurement recording process, the target track position X is obtained at step S1. Then at step S2, the target track position X is sought. This target track position X is in a state where, for example, the read head 76 is positioned with the track 78-N of FIG. 11 being positioned at a track center passing through the read-beginning point 84-1. Then at step S3, a servo sector counter m and a target shift amount δ are reset at 0. At step S4, it is determined whether reaching to the measurement recording start point has been achieved. Specifically, in FIG. 11, this is when, in the on-track state where the read head 76 of the head 22 is positioned at the track center of the track 78-N, a servo sector number=0 is detected and reaching to the read-beginning point 84-1 is achieved. At this time, the positionally-displaced write head 74 is positioned at the recording start point 84-1 on the track 78-(N+1) side. If it is determined in step S4 that reaching to the measurement recording start point has been achieved, the procedure goes to step S5, in which a recording signal is recorded by the head 74 on the medium recording surface to write the measurement pattern 92. When recording of the measurement pattern 92 is started, it is then checked at step S6 whether the next servo sector has been detected. Upon detection of the next servo sector, the procedure goes to step S7, where the servo sector counter m is counted-up by one, and the target shift amount δ is increased by an amount obtained by dividing a track pitch Tp by the number of servo sectors M (Tp/M). Next at step S8, the target track position X is increased by the target shift amount δ updated in step S7, thereby shifting the head 22 to the track 78-(N+1) side. Then at step S10, it is determined whether the value of m of the servo sector counter has been reached the number of servo sectors M. If not reached, the procedure repeats the processes from step S5. With such repetition of processes at steps S5 to S9, the head 22 is sequentially moved in an inner radial direction by the target shift amount δ every time a servo sector is detected, thereby achieving movement by one track pitch in one cycle of rotation. As a result, as depicted in FIG. 10B, the measurement pattern 92 can be recorded along the head path 82 in a spiral manner. If the value of m of the servo sector counter m at step S9 reaches the number of servo sectors M, the series of measurement recording processes ends.

Figure 16:
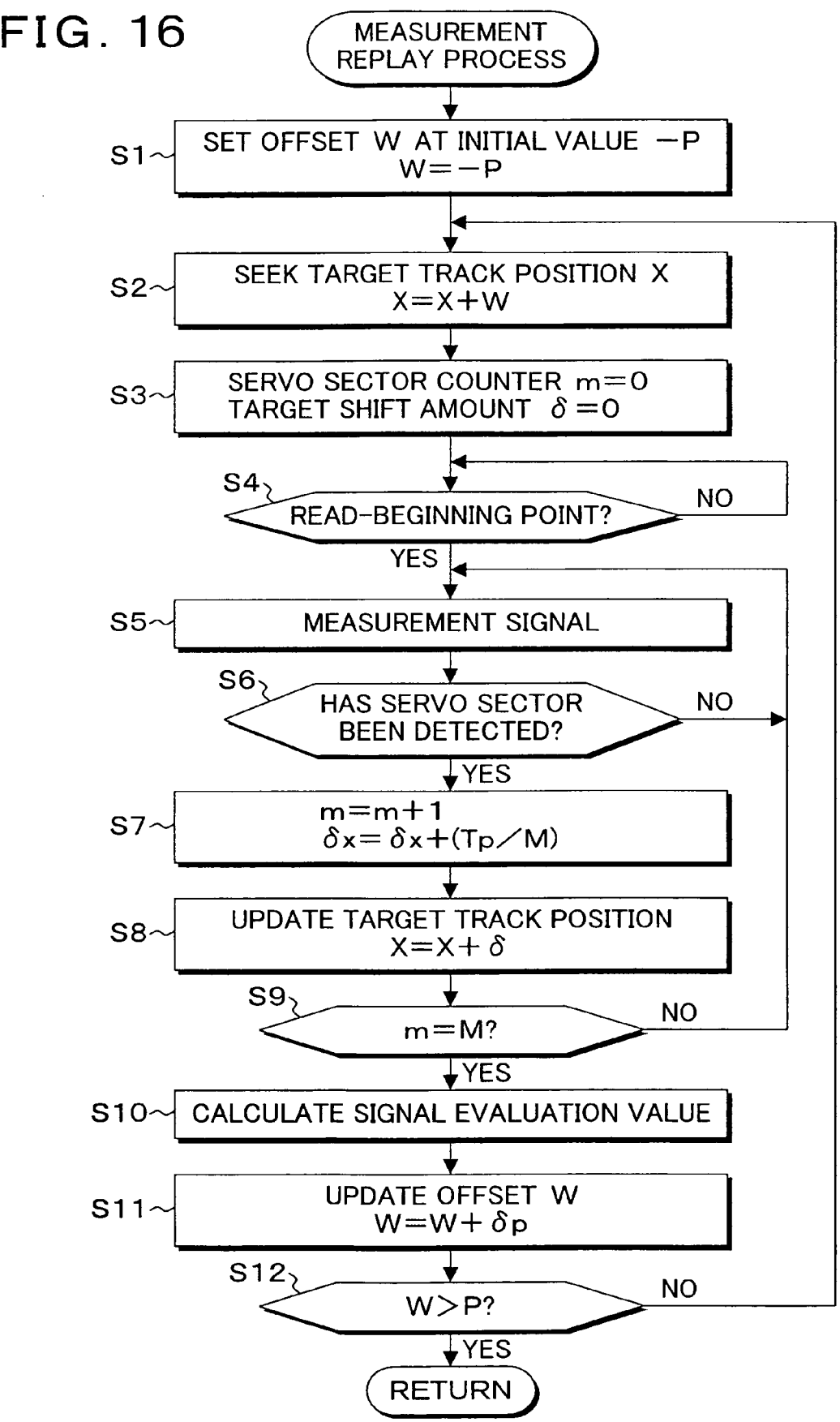
FIG. 16 is a flowchart depicting details of the measurement read process at step S4 of FIG. 14.

FIG. 16 is a flowchart depicting details of the measurement reading process at step S4 of FIG. 14, and is described as follows with reference to FIG. 7. In FIG. 16, in the measurement reading process, at step S1, an offset W is set at an initial value −P, thereby W=−P. This gives an offset to the read-beginning point 84 (−P) in the scanning range 94 for reading measurement in FIG. 12. Then at step S2, X=X+W is sought as the target track position X. That is, the position though which the scanning start point 84 (−P) in the scanning range 94 of FIG. 12 goes is sought with the head. Then at step S4, the servo sector counter m and the target shift amount δ are reset to zero. Then at step S5, sector numbers of the servo sectors are monitored to check whether reaching to the read-beginning point 84 (−P) where sector number=0 has been reached. If reaching to the read-beginning point is determined, the procedure goes to step S5 for reading the measurement pattern by the read head 76. Then at step S6, it is checked whether a servo sector has been detected. If a servo sector is detected, at step S7, the servo sector counter m is counted-up by one and, at the same time, the target shift amount δ is increased by the amount obtained by dividing the track pitch Tp by the number of servo sectors M (Tp/M). Then at step S8, the target track position is updated to X=X+δ. These processes at steps S5 to S8 are repeated until the servo sector counter m reaches the number of servo sectors M at step S9. These processes at steps S5 to S9 are identical to the processes at steps S5 to S9 in the measurement recording process depicted in FIG. 15. As a result, as depicted in FIG. 10B, the head path 82 can be drawn in a spiral manner moved by one track from a track passing though the read-beginning point. As a result, in FIG. 12, the recording pattern 92 is read by moving the read head 76 along the reading path 88 (−P), and the sampled values of the amplitudes of the read-back signal from servo sector=0 to M−1 are stored in the memory. Then at step S10, as a signal evaluation value from the read-back signal obtained through scanning of one cycle of track in a spiral manner, an average value or an accumulated value of the amplitudes of the read-back signal for one cycle of track as depicted in FIG. 13B, for example, is calculated. Then at step S11, after the offset W is updated to a value obtained by adding a shift amount δp, the procedure goes to step S12 where, if the offset W does not exceed offset value+P on the opposite side of the scanning range, the procedure returns to step S2, obtaining and seeking a target track value X at the next read-beginning point in the scanning range 92, reading the measurement pattern as for the track-like range in a spiral manner similarly, and then calculating signal evaluation values. Here, the shift amount δp represents a step width at the time of scanning the scanning range 92, and a value that can achieve a sufficient accuracy for head position displacement correction can be specified. If the offset W exceeds the offset value+P representing a limit value on the opposite side of the scanning range 94, the procedure returns to step S12, the procedure returns to the main routine of FIG. 14. At step S5, from a profile of the evaluation values, for example, a profile of the amplitudes of the read-back signal, a head position displacement is detected for table registration. Also, the present invention relates to a program for head position displacement measurement executed on the MPU 26 provided with a magnetic disk apparatus. The program according to the present embodiment includes the contents as depicted in flowcharts in FIGS. 14 to 16. Furthermore, the present invention provides a storage medium having stored therein a measuring program executed on an MPU of a magnetic disk apparatus for head position displacement measurement. Here, the storage medium includes a simple storage medium, such as a CD-ROM, floppy disk (RR), DVD disk, magneto-optical disk, or IC card, and a storage medium, such as a hard disk drive, provided internal or external to a computer system, as well as a database that holds a data program through a line or the like, other computer systems and their database, and further a transmission medium on a line. Still further, in the above embodiment, an exemplary case has been described in which, at the time of measurement recording and measurement reading, the head is moved in a radial direction by at least one track during one cycle of track, recording the measurement pattern and reading the measurement pattern drawing a head path in a spiral manner. Alternatively, with the amount of movement of the head in the radial direction in one cycle of track being taken as one track width or more, recording and reading the measurement pattern may be performed with a head path diagonally going across a plurality of tracks. Still further, the present invention includes appropriate modifications without impairing objects and advantages of the present invention, and is not restricted by numerical values mentioned in the above embodiment.

What is claimed is:

1. A storage apparatus comprising:
    a storage medium with a configuration of having a plurality of tracks formed of a magnetic-storable magnetic substance, the tracks being sectioned by a non-magnetic substance that does not allow magnetic recording;
    a head having a read head for reading magnetic storage information recorded on the tracks and a write head for writing magnetic storage information on the tracks;
    a measurement data recording unit that causes the head to move across a predetermined amount at least equal to or more than one track during one lap of track, with a predetermined radial position and a track position of the storage medium being taken as a recoding start point, thereby writing measurement data in the storage medium while drawing a spiral path;
    a measurement data reading unit that causes the head to move, while scanning read-beginning points within a predetermined scanning range from an inner perimeter side including the recording start point of the measurement data recording unit to an outer perimeter side, across the predetermined amount of the measurement data recording unit for each of the read-beginning points, thereby reading the measurement data from the storage medium while drawing a spiral path; and
    a head-position-displacement detecting unit that finds a distribution of evaluation values within the predetermined scanning range from a measurement data readback signal obtained by the measurement data reading unit and detects, in the distribution of evaluation values, an amount of position displacement of the read head and the write head on the storage medium in a radial direction for storage.

2. The storage apparatus according to claim 1, wherein the measurement data recording unit previously sets a target shift amount obtained by dividing a track width by the number of servo sectors for recording in a track perimeter direction at predetermined spacing and, after starting writing from the recording start point, causes the magnetic head to move in a radial direction by the target shift amount upon each servo-sector detection, thereby writing the measurement data in the storage medium while causing the magnetic head to move across at least one track during one lap of track.

3. The storage apparatus according to claim 2, wherein the measurement data reading unit causes, after starting reading from a read-beginning point from which scanning is performed within the predetermined scanning range, the magnetic head to move in the radial direction by the target shift amount upon each servo-sector detection, thereby reading the measurement data from the storage medium while causing the magnetic head to move across at least one track during one lap of track.

4. The storage apparatus according to claim 1, wherein the head position displacement detecting unit detects amplitudes of a read-back signal obtained from the measurement data reading unit as the evaluation values, and detects the amount of position displacement from a peak value in a distribution of the amplitudes.

5. The storage apparatus according to claim 4, wherein the head-position-displacement detecting unit detects, as the amplitudes of the read-back signal, an average value or an accumulated value of the amplitudes of the read-back signal obtained by reading one spiral path.

6. The storage apparatus according to claim 1, wherein the head-position-displacement detecting unit detects error rates of a read-back signal obtained by the measurement data reading unit as the evaluation values, and detects the amount of position displacement from a bottom peak value in the distribution of the error rates.

7. The storage apparatus according to claim 1, wherein the amount of position displacement is detected and stored for each of all track positions of the storage medium by the measurement data recording unit, the measurement data reading unit, and the head-position-displacement detecting unit.

8. The storage apparatus according to claim 1, wherein the amount of position displacement is detected and stored at a plurality of measurement positions on the storage medium in a radial direction by the measurement data recording unit, the measurement data reading unit, and the head-position-displacement detecting unit, and an amount of position displacement at each position other than the measurement positions is found through an interpolating calculation from amounts of position displacement at measurement positions on both sides.

9. A storage control circuit of a storage apparatus provided with
    a storage medium with a configuration of having a plurality of tracks formed of a magnetic-storable magnetic substance, the tracks being sectioned by a non-magnetic substance that does not allow magnetic recording, and
    a head having a read head for reading magnetic storage information recorded on the tracks and a write head for writing magnetic storage information on the tracks, the storage control circuit comprising:
    a measurement data recording unit that causes the magnetic head to move across a predetermined amount at least more than one track during one lap of track, with a predetermined radial position and a track position of the storage medium being taken as a recoding start point, thereby writing measurement data in the storage medium while drawing a spiral path;
    a measurement data reading unit that causes the head to move, while scanning read-beginning points within a predetermined scanning range from an inner perimeter side including the recording start points of the measurement data recording unit to an outer perimeter side, across the predetermined amount of the measurement data recording unit for each of the read-beginning points, thereby reading the measurement data from the storage medium while drawing a spiral path; and a head-position-displacement detecting unit that finds a distribution of evaluation values within the predetermined scanning range from a measurement data read-back signal obtained by the measurement data reading unit and detects, in the distribution of evaluation values, an amount of position displacement of the read head and the write head on the storage medium in a radial direction for storage.

10. The storage control circuit according to claim 9, wherein
the measurement data recording unit previously sets a target shift amount obtained by dividing a track width by the number of servo sectors for recording in a track perimeter direction at predetermined spacing and, after starting writing from the recording start point, causes the magnetic head to move in a radial direction by the target shift amount upon each servo-sector detection, thereby writing the measurement data in the storage medium while causing the magnetic head to move across at least one track during one lap of track.

11. The storage control circuit according to claim 10, wherein
the measurement data reading unit causes, after starting reading from a read-beginning point from which scanning is performed within the predetermined scanning range, the magnetic head to move in the radial direction by the target shift amount upon each servo-sector detection, thereby reading the measurement data from the storage medium while causing the magnetic head to move across at least one track during one lap of track.

12. The storage control circuit according to claim 9, wherein
the head position displacement detecting unit detects amplitudes of a read-back signal obtained from the measurement data reading unit as the evaluation values, and detects the amount of position displacement from a peak value in a distribution of the amplitudes.

13. The storage control circuit according to claim 12, wherein
the head-position-displacement detecting unit detects, as the amplitudes of the read-back signal, an average value or an accumulated value of the amplitudes of the read-back signal obtained by reading one spiral path.

14. The storage control circuit according to claim 9, wherein
the head-position-displacement detecting unit detects error rates of a read-back signal obtained by the measurement data reading unit as the evaluation values, and detects the amount of position displacement from a bottom peak value in the distribution of the error rates.

15. The storage control circuit according to claim 9, wherein
the amount of position displacement is detected and stored for each of all track positions of the storage medium by the measurement data recording unit, the measurement data reading unit, and the head-position-displacement detecting unit.

16. The storage control circuit according to claim 9, wherein
the amount of position displacement is detected and stored at a plurality of measurement positions on the storage medium in a radial direction by the measurement data recording unit, the measurement data reading unit, and the head-position-displacement detecting unit, and an amount of position displacement at each position other than the measurement positions is found through an interpolating calculation from amounts of position displacement at measurement positions on both sides.

17. A head-position-displacement measuring method of a storage apparatus provided with
a storage medium with a configuration of having a plurality of tracks formed of a magnetic-storable magnetic substance, the tracks being sectioned by a non-magnetic substance that does not allow magnetic recording, and
a head having a read head for reading magnetic storage information recorded on the tracks and a write head for writing magnetic storage information on the tracks, the method comprising:
a measurement data recording step of causing the head to move across a predetermined amount at least equal to or more than one track during one lap of track, with a predetermined radial position and a track position of the storage medium being taken as a recoding start point, thereby writing measurement data in the storage medium while drawing a spiral path;
a measurement data reading step of causing the head to move, while scanning read-beginning points within a predetermined scanning range from an inner perimeter side including the recording start point in the measurement data recording step to an outer perimeter side, across the predetermined amount in the measurement data recording step for each of the read-beginning points, thereby reading the measurement data from the storage medium while drawing a spiral path; and
a head-position-displacement detecting step of finding a distribution of evaluation values within the predetermined scanning range from a measurement data read-back signal obtained by the measurement data reading unit and detecting, in the distribution of evaluation values, an amount of position displacement of the read head and the write head on the storage medium in a radial direction for storage 18. The head-position-displacement measuring method according to claim 17, wherein
the measurement data recording step previously sets a target shift amount obtained by dividing a track width by the number of servo sectors for recording in a track perimeter direction at predetermined spacing and, after starting writing from the recording start point, causes the magnetic head to move in a radial direction by the target shift amount upon each servo-sector detection, thereby writing the measurement data in the storage medium while causing the magnetic head to move across at least one track during one lap of track.

19. The head-position-displacement measuring method according to claim 18, wherein
in the measurement data reading step, after reading from a read-beginning point from which scanning is performed within the predetermined scanning range is started, the magnetic head is caused to move in the radial direction by the target shift amount upon each servo-sector detection, thereby reading the measurement data from the storage medium while the magnetic head is caused to move across at least one track during one lap of track.

20. The head-position-displacement measuring method according to claim 18, wherein
in the head position displacement detecting step, amplitudes of a read-back signal obtained from the measurement data reading step as the evaluation values are detected, and the amount of position displacement is detected from a peak value in a distribution of the amplitudes.

* * * * *